(12) United States Patent
Asami

(10) Patent No.: US 7,639,432 B2
(45) Date of Patent: Dec. 29, 2009

(54) IMAGING LENS AND CAMERA SYSTEM INCLUDING THE SAME LENS

(75) Inventor: Taro Asami, Saitama (JP)

(73) Assignee: Fujinon Corporation, Saitama-Shi (JP)

(*) Notice: Subject to any disclaimer, the term of this patent is extended or adjusted under 35 U.S.C. 154(b) by 0 days.

(21) Appl. No.: 11/850,585

(22) Filed: Sep. 5, 2007

(65) Prior Publication Data

US 2008/0055741 A1    Mar. 6, 2008

(30) Foreign Application Priority Data

Sep. 6, 2006  (JP) .............................. 2006-241493
Aug. 27, 2007  (JP) .............................. 2007-220076
Aug. 31, 2007  (JP) .............................. 2007-226849

(51) Int. Cl.
  *G02B 9/60*  (2006.01)
  *G02B 9/34*  (2006.01)
(52) U.S. Cl. ..................................... 359/770; 359/783
(58) Field of Classification Search ......... 359/738–740, 359/771, 770, 783, 686
  See application file for complete search history.

(56) References Cited

U.S. PATENT DOCUMENTS 4,059,344 A  * 11/1977  Yamasita .................... 359/783

FOREIGN PATENT DOCUMENTS

| JP | 1-265216 A | 10/1989 |
|---|---|---|
| JP | 2004-61763 A | 2/2004 |
| JP | 2004-145256 A | 5/2004 |
| JP | 2004-254888 A | 12/2004 |
| JP | 2006/168683 A | 6/2006 |
| JP | 2006-243092 A | 9/2006 |

* cited by examiner

*Primary Examiner*—Alicia M Harrington
(74) *Attorney, Agent, or Firm*—Birch, Stewart, Kolasch & Birch, LLP

(57) ABSTRACT

An imaging lens comprises, in order from an object side: a first lens having a negative refractive power with a concave surface directed to an image side thereof; a second lens having a positive refractive power with a convex surface directed to an image side thereof and having an absolute value of a radius of curvature on the image side is equal to or smaller than that on an object side thereof; an aperture stop; a third lens which is a planoconvex lens having a plane on an object side thereof or a double-convex lens having on an object side thereof a surface of which an absolute value of a radius of curvature is larger than that on an image side thereof; and a compound lens of a fourth lens and a fifth lens, the compound lens having a positive composite power.

11 Claims, 26 Drawing Sheets

IMAGING LENS AND CAMERA SYSTEM INCLUDING THE SAME LENS

BACKGROUND OF THE INVENTION

1. Field of the Invention

The present invention relates to an imaging lens for forming an optical image on a solid state imaging device which is suitable for use for an onboard camera, a monitor camera, a mobile terminal camera and the like and a camera system which utilizes the imaging lens.

2. Description of the Related Art

Onboard cameras are known which pick up images of surroundings of a motor vehicle on which the cameras are installed to show the driver conditions surrounding the vehicle via images on a monitor screen (for example, refer to JP-A-2006-168683). These onboard cameras include, for example, an outside camera which is provided on an outside of the vehicle for assisting the driver to drive the vehicle by picking up images of surroundings which lie within a blind range to the driver and an inside camera which is designed to pick up images of conditions resulting when the vehicle is involved in a traffic accident in the same way as viewed by the driver. In recent years, in association with an increase in performance and a decrease in price of solid state imaging devices, it is becoming a general trend to equip onboard cameras even on ordinary vehicles.

In the related art, imaging lenses like those described in, for example, JP-A-1-265216 and JP-A-2004-145256 are known as imaging lenses for use for monitor cameras. The imaging lens described in JP-A-1-265216 provides an f number of f/1.4, which is bright, and attains an angle of view of 80 degrees or more. The imaging lens described in JP-A-2004-145256 provides an f number of f/2.4, which is relatively bright, and attains a wide angle of view which can provide a semi-angle of view of 60 degrees or more In addition, those described in JP-A-2004-61763 and JP-A-2004-354888 are known as being similar to the imaging lenses described above.

With the imaging lens described in JP-A-1-265216, there is provided a drawback that the field curvature is large. With the imaging lens described in JP-A-2004-145256, there is provided a drawback that the distortion is large, and hence, images picked up by the relevant lens have to be processed to be displayed on a monitor and image quality in a peripheral portion thereof is deteriorated. The imaging lenses described in JP-A-2004-61763 and JP-A-2004-354888 are lenses developed for endoscopes, and their f numbers which are 3.5 or larger present a drawback that the lenses with those f numbers too dark to be used as onboard cameras and monitor cameras. Furthermore, there are circumstances in relation to imaging lenses for onboard cameras that when used as an outside camera, a weathering resistance is required which is good enough to make it difficult for the lens surface to be deteriorated, while when used as an inside camera, a thermal expansion resistance is required which is good enough to bear thermal expansions caused in association with an increase in temperature within the passenger compartment during summer time.

SUMMARY OF THE INVENTION

The invention has been made in view of the problems inherent in the related art, and an object thereof is to provide an imaging lens which can maintain a good optical performance and which is small in size, light in weight and low in cost and a camera which includes the imaging lens.

With a view to attaining the object, according to the invention, there is provided an imaging lens comprising, in order from an object side: a first lens having a negative refractive power with a concave surface directed to an image side thereof; a second lens having a positive refractive power with a convex surface directed to an image side thereof and having an absolute value of a radius of curvature on the image side is equal to or smaller than that on an object side thereof; an aperture stop; a third lens which is a planoconvex lens having a plane on an object side thereof or a double-convex lens having on an object side thereof a surface of which an absolute value of a radius of curvature is larger than that on an image side thereof; and a compound lens of a fourth lens and a fifth lens, the compound lens having a positive composite power.

In addition, according to the invention, the second lens is a double-convex lens, whereby field curvature is corrected properly. Additionally, the fourth lens is a double-convex lens, whereby chromatic aberration is corrected properly. Note that by making the third lens be made up of a double-convex lens, the field curvature can be corrected further properly.

According to the invention, letting a focal length of the imaging lens be F, a focal length of the third lens be F3, and an airspace between the first lens and the second lens be D2, the following conditional expressions are satisfied:

$$1 < F3/F < 4 \quad (1)$$

$$0.1 < D2/F < 2 \quad (2)$$

In the event that a lower limit of the conditional expression (1) is surpassed, coma aberration is produced, thereby making it impossible to obtain a proper image. On the contrary, in the event that an upper limit of the conditional expression (1) is surpassed, a distance from the final surface of the imaging lens to a sensor plane (an image plane) becomes short, thereby making it difficult to provide various plane plates such as an infrared light cut-off filter, a cover glass, a low-pass filter and the like which are necessary for the imaging lens. In the event that a lower limit of the second conditional expression (2) is surpassed, the first lens and the second lens become too close to each other or picking up an image at a wide angle becomes difficult. In the event that an upper limit of the second conditional expression (2) is surpassed, there is produced a problem that the first lens is enlarged. In addition, in order to correct properly coma aberration with a sufficient length of back focus, the following conditional expression is preferably satisfied:

$$1.5 < F3/F < 3.5$$

and in order to reduce further the effect of coma aberration, the following conditional expression is preferably satisfied:

$$2.0 < F3/F < 3.0$$

In addition, in order to attain a miniaturization while maintaining a wide angle of view, the following conditional expression is preferably satisfied:

$$0.3 < D2/F < 1.5$$

In addition, according to the invention, letting a distance from the image side surface of the second lens to the aperture stop be D4, a distance from the aperture stop to the object side surface of the third lens be D5, and refractive indexes relative to a d-line of the fourth lens and the fifth lens be N4, N5, respectively, the following conditional expressions are satisfied:

$$1 < D4/D5 \quad (3)$$

$$0.05 < |N4 - N5| < 0.40 \quad (4)$$

In the event that the range defined by the conditional expression (3) is not met, the size of a bundle of rays of light incident on the third lens becomes large, which, hence, increases the apertures of the third lens to the fifth lens. This eventually increases the dimensions of the imaging lens in a longitudinal direction and a radial direction, which is unsuitable for the imaging lens that should be built in a narrow space. In the event that a lower limit of the conditional expression (4) is surpassed, the curvature of the cementing surface becomes intense for chromatic aberration correction, lens processing being thereby made difficult. In the event that an upper limit of the conditional expression (4) is surpassed, an expensive glass is necessary to use, thereby being costly. In addition, in order to reduce the dimension in the radial direction, the following conditional expression is preferably satisfied:

$$2.4 < D4/D5$$

In addition, in order to correct chromatic aberration properly, the following conditional expression is preferably satisfied:

$$0.2 < |N4 - N5| < 0.40$$

In addition, according to the invention, a linear expansion coefficient of a material for the first lens to the fifth lens is $12 \times 10^{-6}$ [1/K] or less, thereby making it possible to obtain an imaging lens which is suitable for an onboard camera which is used under an environment such as occurring in the passenger compartment of a vehicle during summer time in which the temperature becomes high. Note that by attaining preferably a linear expansion coefficient of $11 \times 10^{-6}$ [1/K] and more preferably a linear expansion coefficient of $10.5 \times 10^{-6}$ [1/K], the deterioration in performance of the lens attributed to thermal expansion can be suppressed.

According to the invention, there can be provided a camera system including an imaging lens as set forth and a solid state imaging device for converting an optical image picked up by the imaging lens into an electric signal, which is suitable for onboard cameras or the like for which good weathering resistance and thermal expansion resistance are required.

DETAILED DESCRIPTION OF THE INVENTION

Figure 26:
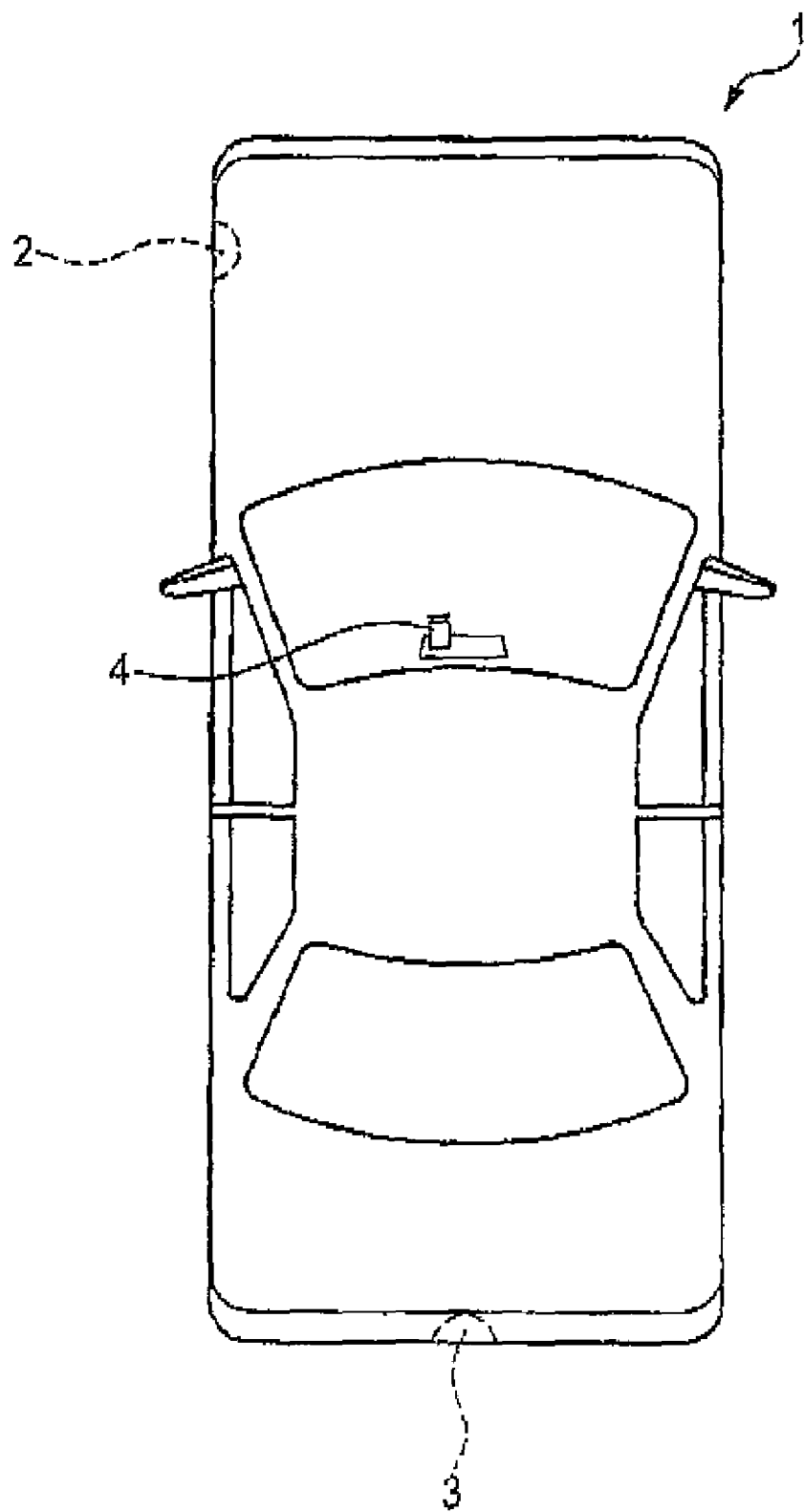
FIG. 26 is an explanatory view, of or board cameras.

In FIG. 26, equipped on a motor vehicle 1 are an outside camera 2 for picking up images of surroundings of the vehicle 1 which lie in a blind area to the driver which is located close to a side of the vehicle 1 where a front passenger's seat is fitted, an outside camera 3 for pick up images of surroundings of the vehicle 1 in a blind area to the driver which is located at the rear of the vehicle 1 and an inside camera 4 mounted on a back side of an inside rearview mirror for picking up images of surroundings of the vehicle 1 in the same way as viewed by the driver. The outside camera 2, the outside camera 3 and the inside camera 4 each include an imaging lens 10 and a solid state imaging device 17 for converting an optical image picked up by the imaging lens 10 into an image signal (refer to FIG. 1). A material which is strong enough to resist surface deterioration by wind and rain, temperature change due to direct sun light, and fats and oils and chemicals such as detergents is used for the imaging lenses 10 of the outside camera 2, the outside camera 3 and the inside camera 4. Hereinafter, embodiments of the imaging lens 10 will be described.

Embodiment 1

Figure 1:
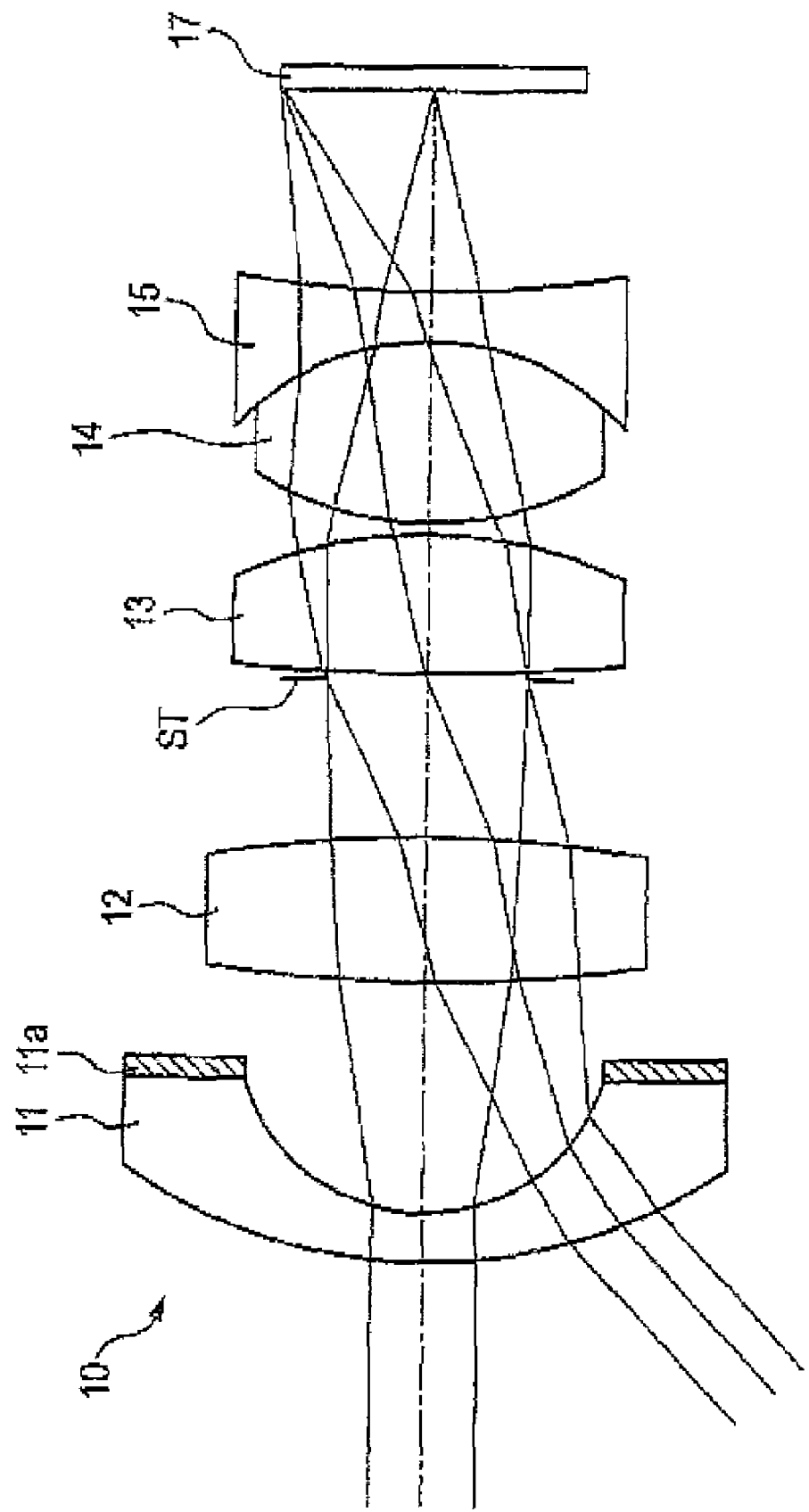
FIG. 1 is a diagram showing an optical path of a first embodiment.
Figure 2:
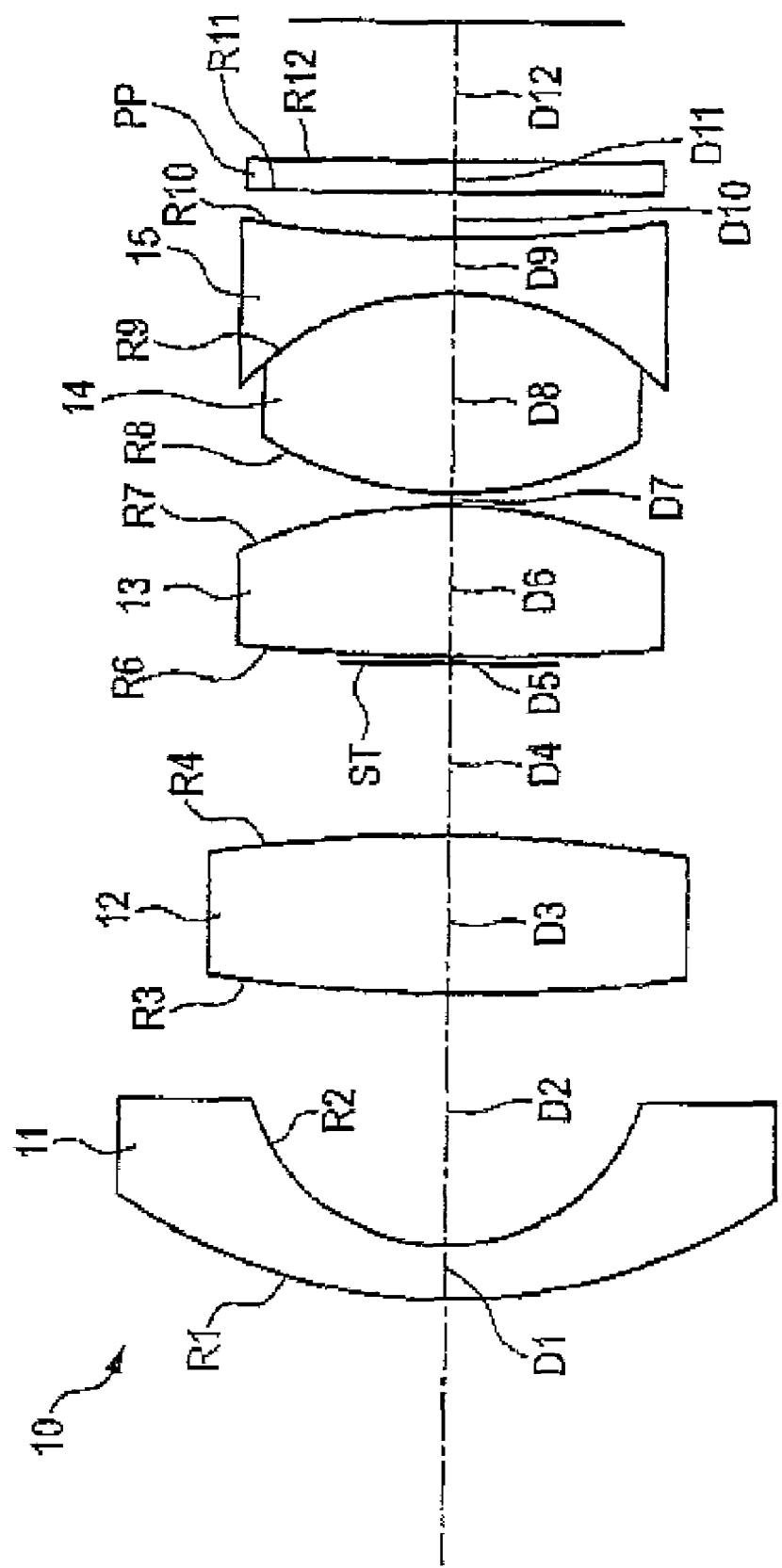
FIG. 2 is a sectional view showing a lens configuration of the first embodiment.

In FIGS. 1 and 2, an imaging lens 10 includes, in order from an object side, a first lens 11, a second lens 12, a third lens 13, a fourth lens 14 and a fifth lens 15. The first to fifth lenses are all glass spherical lenses. The first lens 11 has a negative meniscus shape with a convex surface directed to an object side and a concave surface directed to an image side thereof. A light cut-off film 11a is provided on an area which is located radially outwards of the image side concave surface of the first lens 11. The light cut-off film prevents the entrance of light from the outside of an effective aperture so as to prevent the occurrence of a ghost image on an image plane. In addition, although the light cut-off film 11a is an opaque paint layer which is provided on the outside of the effective aperture, an opaque plate material may be provided on A rear side of the first lens 11. In addition, the position where the light cut-off film 11a is provided is not limited to the rear of the first lens 11 but may be provided between the other lenses as required.

The second lens 12 has a double-convex shape with convex surfaces directed to both of an object side and an image side thereof, respectively, and an absolute value of a radius of curvature of the convex surface on the image side is smaller than that on the object side. An aperture stop ST is provided between the second lens 12 and the third lens 13. The third lens 13 has a double-convex shape with convex surfaces directed to both of an object side and an image side thereof, respectively, and an absolute value of a radius of curvature of the convex surface on the image side is smaller than that on the object side.

The fourth lens 14 has a double-convex shape with convex surfaces directed to both of an object side and an image side thereof, respectively, and an absolute value of a radius of curvature of the convex surface on the image side is smaller than that on the object side. The fifth lens 15 has a double-concave shape with Concave surfaces directed to both of an object side and an image side thereof, respectively, and an absolute value of a radius of curvature of the concave surface on the object side is smaller than that on the image side. The fourth lens 14 and the fifth lens 15 are cemented to each other. A composite power of the fourth lens 14 and the fifth lens 15 is positive.

Figure 3:
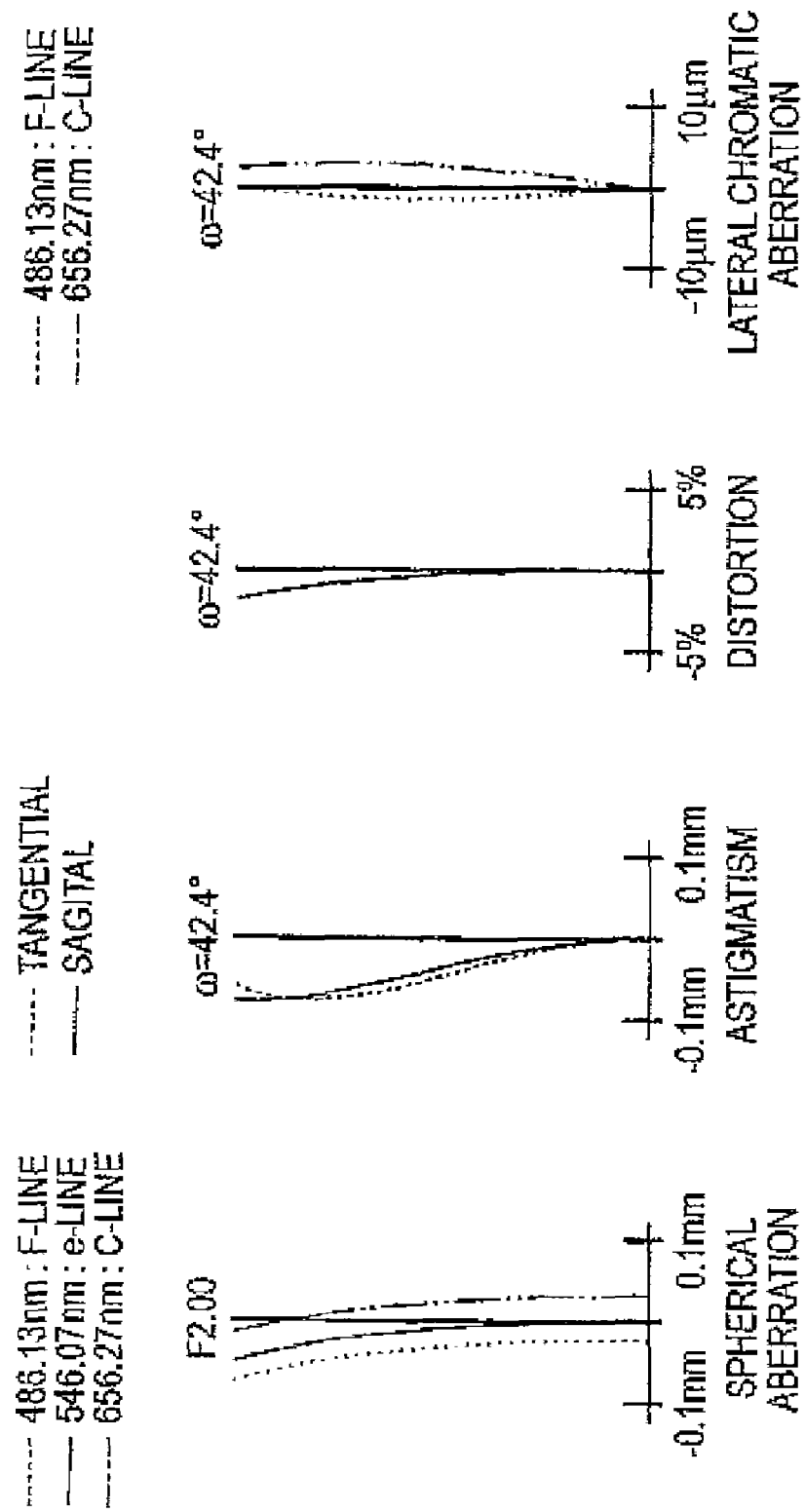
FIG. 3 are aberration diagrams of the first embodiment.

A parallel plane plate PP is provided between the fifth lens 15 and an image plane. Note that a light receiving plane of the solid state imaging device 17 such as a CCD image sensor or CMOS image sensor is positioned on the image plane. The parallel plane plate PP is such that filter devices such as a cover glass or an infrared light cut-off filter for the solid state imaging device 17 are converted into a single parallel plane plate. Lens data of the imaging lens 10 are shown in Table 1 below, linear thermal expansion coefficients within a range of −30° C. to 60° C. and linear thermal expansion coefficients within a range of 100° C. to 300° C. of the first lens 11 to the fifth lens 15 are shown in Table 2 below. In addition, aberrations of the imaging lens 10 are shown in FIG. 3. In FIG. 3, with respect to spherical aberration and lateral chromatic aberration, a broken line denotes an aberration on a F-line (486.13 nm), a solid line denotes an aberration on an e-line (546.07 nm) and a dashed-two dotted line denotes an aberration on a C-line (656.27 nm). With respect to astigmatism, a broken line denotes an astigmatism on tangential and a solid line denotes an astigmatism on sagital. The same is applied to figures relating to subsequent other embodiments.

Note that in the table, R represents a radius of curvature of a lens and a parallel plane plate, and D represents an inter surface space or an air space Nd represents a refractive index relative to a d-line (wavelength being 587.56 nm), and vd represents an Abbe number based on the d-line. This is also true with other embodiments which will be described later on.

In the imaging lens 10, letting a focal length of the imaging lens be F, a focal length of the third lens 13 be F3, F=3.251 mm, F3=7.605 mm, and F3/F=2.339, and the following conditional expression is satisfied:

$$1 < F3/F < 4 \quad (1).$$

From an airspace D2 between the first lens 11 and the second lens 12, D2/F=1.138, and the following conditional expression is satisfied;

$$0.1 < D2/F < 2 \quad (2)$$

From a space D4 from the image side surface of the second lens 12 to the aperture stop ST and a space D5 from the aperture stop ST to the third lens 13, D4/D5=25, and the following conditional expression is satisfied:

$$1 < D4/D5 \quad (3)$$

From refractive indexes N4, N5 relative to a d-line of the fourth lens 14 and the fifth lens 15, |N4−N5|=0.264, and the following conditional expression is satisfied:

$$0.05 < |N4-N5| < 0.40 \quad (4)$$

In addition, linear thermal expansion coefficients of the first lens 11 to the fifth lens 15 are each $12 \times 10^{-5}$ [1/K] or less.

Embodiment 2

Figure 4:
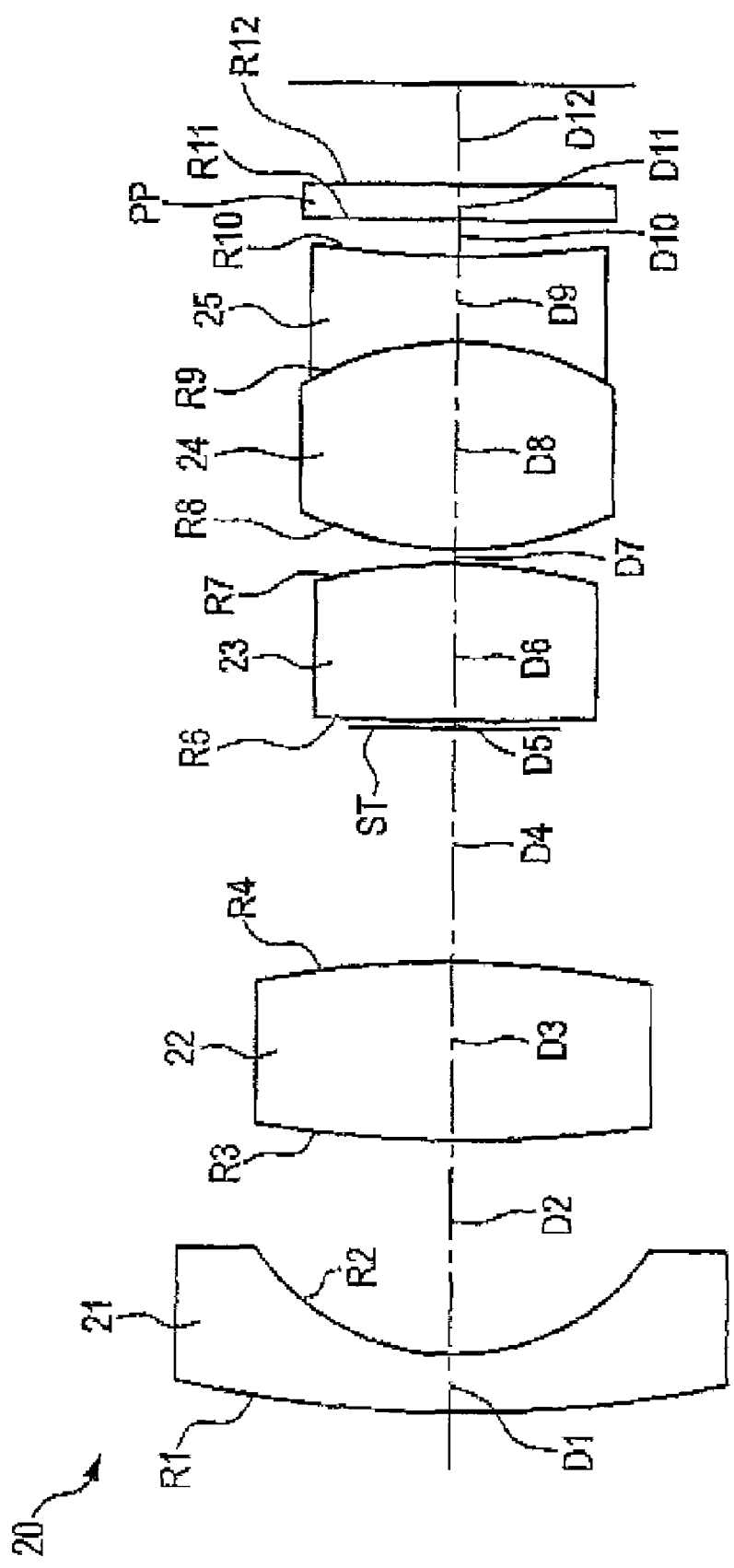
FIG. 4 is a sectional view showing a lens configuration of a second embodiment.
Figure 5:
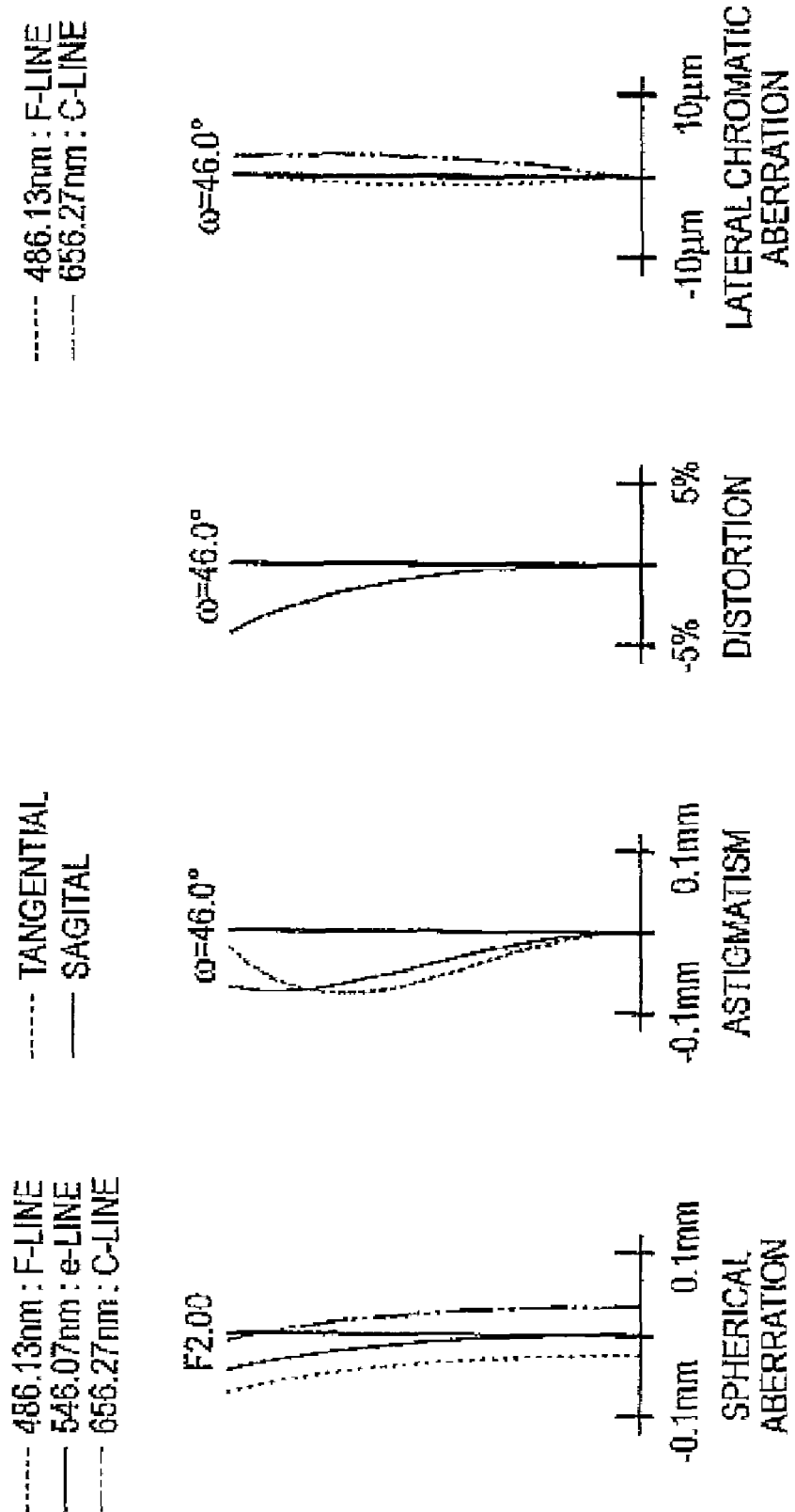
FIG. 5 are aberration diagrams of the second embodiment.

In FIG. 4, an imaging lens 20 includes, in order from an object side, a first lens 21, a second lens 22, a third lens 23, a fourth lens 24 and a fifth lens 25. The first lens 21 has a negative meniscus shape with a convex surface directed to an object side and a concave surface directed to an image side thereof. The second lens 22 has a double-convex shape with convex surfaces directed to both of an object side and an image side thereof, respectively, and an absolute value of a radius of curvature of the convex surface on the image side is smaller than that on the object side. An aperture stop ST is provided between the second lens 22 and the third lens 23. The third lens 23 has a double-convex shape with convex surfaces directed to both of an object side and an image side thereof, respectively, and an absolute value of a radius of curvature of the convex surface on the image side is smaller than that on the object side. The fourth lens 24 has a double-convex shape with convex surfaces directed to both of an object side and an image side thereof, respectively, and an absolute value of a radius of curvature of the convex surface on the image side is smaller than that on the object side. The fifth lens 25 has a double-concave shape with concave surfaces directed to both of an object side and an image side thereof, respectively, and an absolute value of a radius of curvature of the concave surface on the object side is smaller than that on the image side. The fourth lens 24 and the fifth lens 25 are cemented to each other, and a composite power of the fourth lens 24 and the fifth lens 25 is positive. Lens data of the imaging lens 20 are shown in Table 3 below, and linear thermal expansion coefficients of the first lens 21 to the fifth lens 25 are shown in Table 4 below. In addition, aberrations of the imaging lens 20 are shown in FIG. 5.

TABLE 1

(Embodiment 1)

| | | R | D | Nd | vd |
|---|---|---|---|---|---|
| | 1 | 7.9016 | 0.8 | 1.83481 | 42.7 |
| | 2 | 2.8796 | 3.7 | | |
| | 3 | 25 | 2.3 | 1.83481 | 42.7 |
| | 4 | −20 | 2.5 | | |
| ST | 5 | 0 | 0.1 | | |
| | 6 | 31.1189 | 2.2 | 1.7725 | 49.6 |
| | 7 | −7.0594 | 0.2 | | |
| | 8 | 4.9925 | 2.91 | 1.58313 | 59.4 |
| | 9 | −4 | 0.8 | 1.84666 | 23.8 |
| | 10 | 19.5542 | 0.5 | | |
| | 11 | 0 | 0.5 | 1.5168 | 64.2 |
| | 12 | 0 | 2.063 | | |
| IMG | | 0 | 0 | | |

TABLE 2

| | Linear expansion coefficients | |
|---|---|---|
| | −30~70° C. $10^{-6}$ [1/K] | 100~300° C. $10^{-6}$ [1/K] |
| First lens | 6.2 | 7.6 |
| Second lens | 6.2 | 7.6 |
| Third lens | 6.2 | 7.4 |
| Fourth lens | 6.6 | 7.6 |
| Fifth lens | 8.8 | 10.4 |

TABLE 3

(Embodiment 2)

|    |    | R | D | Nd | vd |
|----|----|---------|-------|---------|------|
|    | 1  | 17.4305 | 0.8   | 1.83481 | 42.7 |
|    | 2  | 3.1766  | 3.01  |         |      |
|    | 3  | 17.0623 | 2.5   | 1.83481 | 42.7 |
|    | 4  | −12.795 | 3.27  |         |      |
| ST | 5  | 0       | 0.1   |         |      |
|    | 6  | 35.3964 | 2.2   | 1.7725  | 49.6 |
|    | 7  | −7.4235 | 0.2   |         |      |
|    | 8  | 4.7288  | 2.91  | 1.58313 | 59.4 |
|    | 9  | −4.0003 | 1.2   | 1.84666 | 23.8 |
|    | 10 | 14.4035 | 0.5   |         |      |
|    | 11 | 0       | 0.5   | 1.5168  | 64.2 |
|    | 12 | 0       | 1.382 |         |      |
| IMG |   | 0       | 0     |         |      |

TABLE 4

| | Linear expansion coefficients | |
|---|---|---|
| | −30~70° C. $10^{-6}$ [1/K] | 100~300° C. $10^{-6}$ [1/K] |
| First lens | 6.2 | 7.6 |
| Second lens | 6.2 | 7.6 |
| Third lens | 6.2 | 7.4 |
| Fourth lens | 6.6 | 7.6 |
| Fifth lens | 8.8 | 10.4 |

In the imaging lens 20, letting a focal length of the imaging lens be F, a focal length of the third lens 23 be F3, F=3.077 mm, F3=8.087 mm, and F3/F=2.629, and the following conditional expression is satisfied:

$$1 < F3/F < 4 \quad (1)$$

From an airspace D2 between the first lens 21 and the second lens 22, D2/F=0.978, and the following conditional expression is satisfied:

$$0.1 < D2/F < 2 \quad (2)$$

From a space D4 from the image side surface of the second lens 22 to the aperture stop ST and a space D5 from the aperture stop ST to the third lens 23, D4/D5=32.7, and the following conditional expression is satisfied:

$$1 < D4/D5 \quad (3)$$

From refractive indexes N4, N5 relative to a d-line of the fourth lens 24 and the fifth lens 25, |N4−N5|=0.264, and the following conditional expression is satisfied:

$$0.05 < |N4 - N5| < 0.40 \quad (4)$$

In addition, linear thermal expansion coefficients of the first lens 21 to the fifth lens 25 are each $12 \times 10^{-6}$ [1/K] or less.

Embodiment 3

Figure 6:
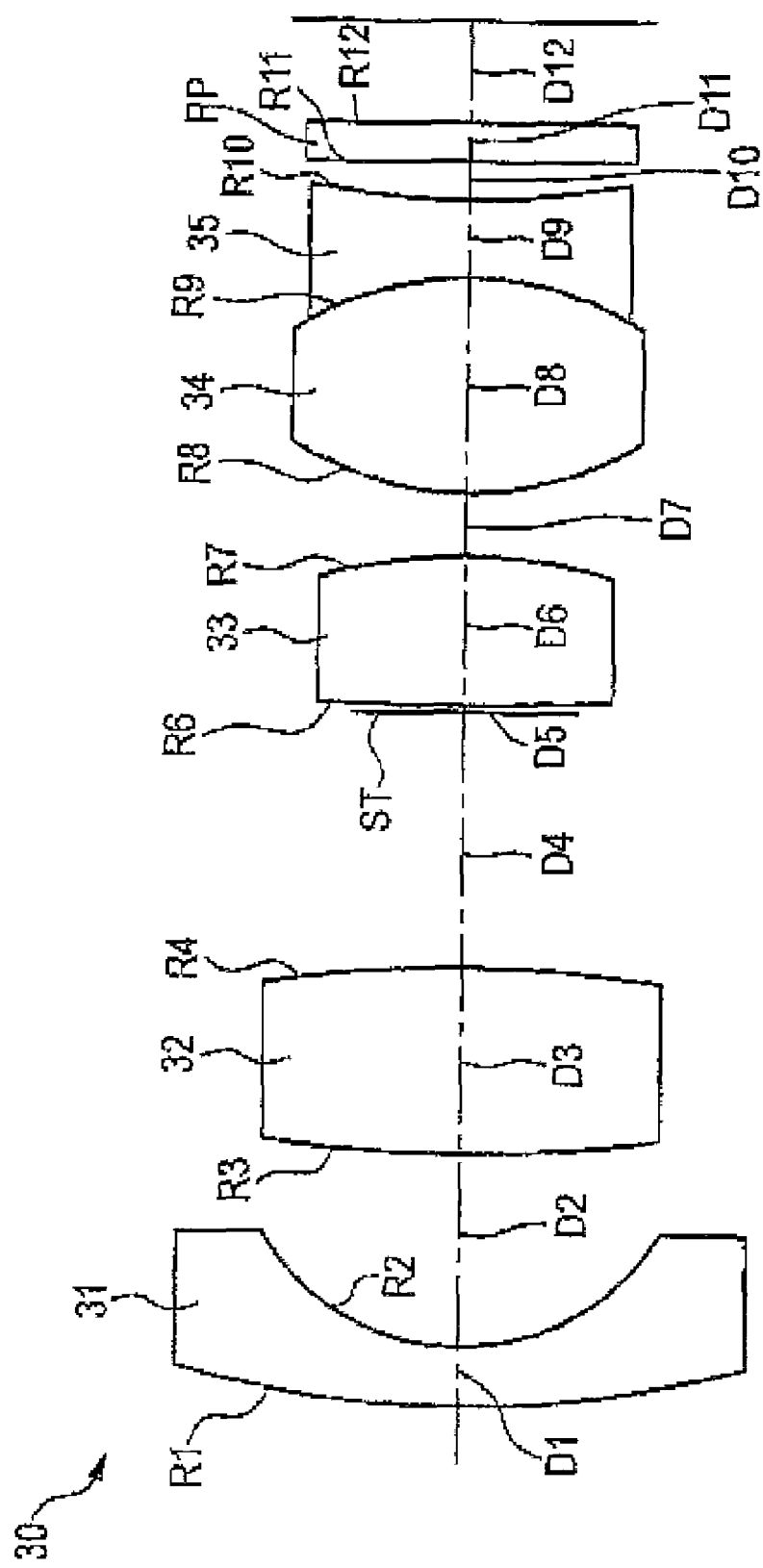
FIG. 6 is a sectional view showing a lens configuration of a third embodiment.
Figure 7:
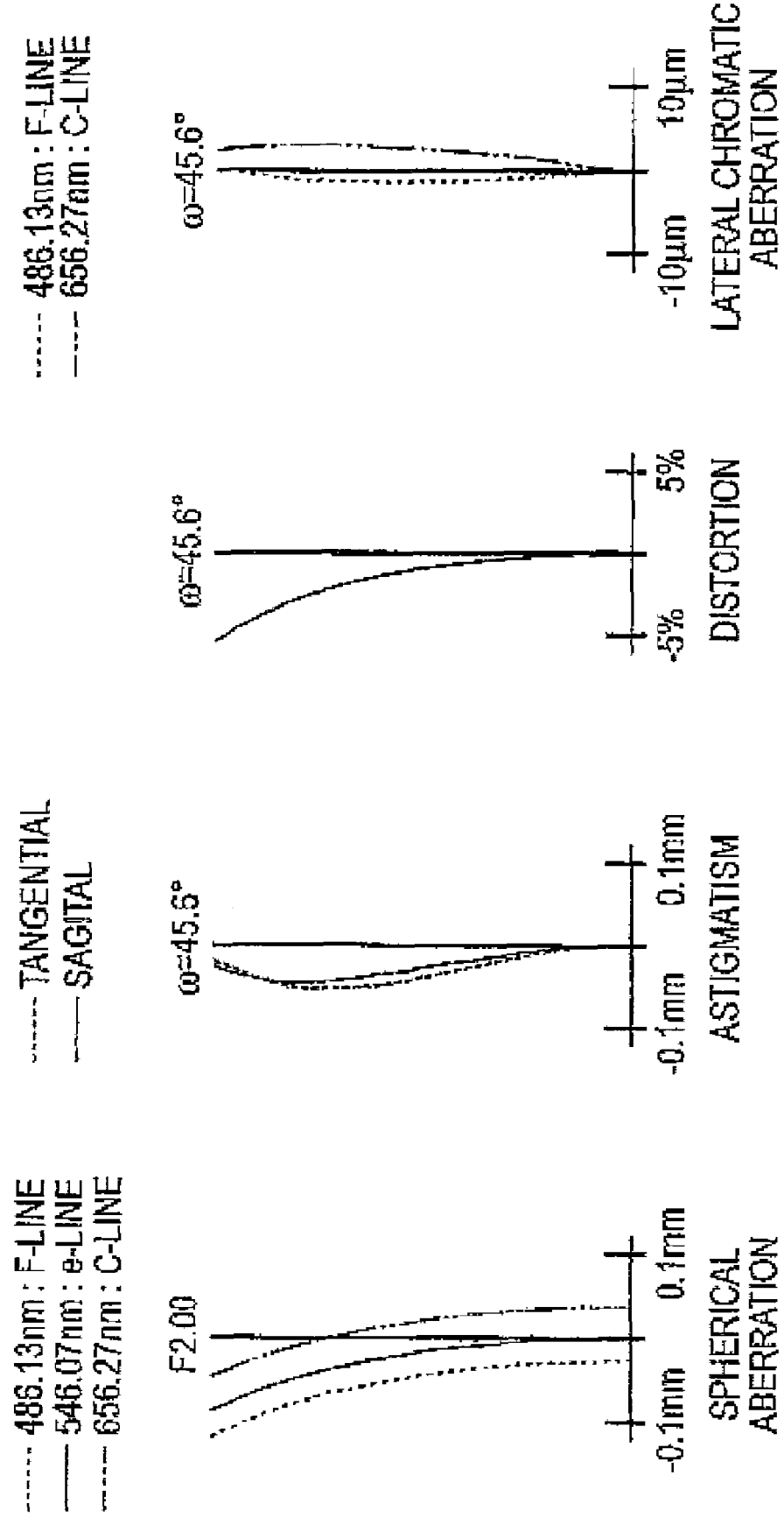
FIG. 7 are aberration diagrams of the third embodiment.

In FIG. 6, an imaging lens 30 includes, in order from an object side, a first lens 31 to a fifth lens 35. The first lens 31 has a negative meniscus shape with a convex surface directed to an object side and a concave surface directed to an image side thereof. The second lens 32 has a double-convex shape with convex surfaces directed to both of an object side and an image side thereof, respectively, and an absolute value of a radius of curvature of the convex surface on the image side is smaller than that on the object side. An aperture stop ST is provided between the second lens 32 and the third lens 33. The third lens 33 has a double-convex shape with convex surfaces directed to both of an object side and an image side thereof, respectively, and an absolute value of a radius of curvature of the convex surface on the image side is smaller than that on the object side. The fourth lens 34 has a double-convex shape with convex surfaces directed to both of an object side and an image side thereof, respectively, and an absolute value of a radius of curvature of the convex surface on the image side is equal to an absolute value of a radius of curvature of the convex surface on the object side. The fifth lens 35 has a double-concave shape with concave surfaces directed to both of an object side and an image side thereof, respectively, and an absolute value of a radius of curvature of the concave surface on the object side is smaller than that on the image side. The fourth lens 34 and the fifth lens 35 are cemented to each other, and a composite power of the fourth lens 34 and the fifth lens 35 is positive. Lens data of the imaging lens 30 are shown in Table 5 below, and linear thermal expansion coefficients of the first lens 31 to the fifth lens 35 are shown in Table 6 below. In addition, aberrations of the imaging Lens 30 are shown in FIG. 7.

TABLE 5

(Embodiment 3)

|    |    | R | D | Nd | vd |
|----|----|---------|------|---------|------|
|    | 1  | 13.381  | 0.80 | 1.83481 | 42.7 |
|    | 2  | 3.0251  | 2.60 |         |      |
|    | 3  | 20      | 2.50 | 1.83481 | 42.7 |
|    | 4  | −15     | 3.40 |         |      |
| ST | 5  | 0       | 0.10 |         |      |
|    | 6  | 46.7662 | 2.00 | 1.7725  | 49.6 |
|    | 7  | −6.7171 | 0.85 |         |      |
|    | 8  | 4.3385  | 2.90 | 1.58313 | 59.4 |
|    | 9  | −4.3385 | 1.05 | 1.84666 | 23.8 |
|    | 10 | 10.8859 | 0.50 |         |      |
|    | 11 | 0       | 0.50 | 1.5168  | 64.2 |
|    | 12 | 0       | 1.36 |         |      |
| IMG |   | 0       | 0    |         |      |

TABLE 6

| | Linear expansion coefficients | |
|---|---|---|
| | −30~70° C. $10^{-6}$ [1/K] | 100~300° C. $10^{-6}$ [1/K] |
| First lens | 6.2 | 7.6 |
| Second lens | 6.2 | 7.6 |
| Third lens | 6.2 | 7.4 |
| Fourth lens | 6.6 | 7.6 |
| Fifth lens | 8.8 | 10.4 |

In the imaging lens 30, letting a focal length of the imaging lens be F, a focal length of the third lens 33 be F3, F=3.123 mm, F3=7.692 mm, and F3/F=2.463, and the following conditional expression is satisfied:

$$1 < F3/F < 4 \quad (1)$$

From an airspace D2 between the first lens 31 and the second lens 32, D2/F=0.831, and the following conditional expression is satisfied:

$$0.1 < D2/F < 2 \quad (2)$$

From a space D4 from the image side surface of the second lens 32 to the aperture stop ST and a space D5 from the aperture stop ST to the third lens 33, D4/D5=34.046, and the following conditional expression is satisfied:

$$1 < D4/D5 \quad (3)$$

From refractive indexes N4, N5 relative to a d-line of the fourth lens 34 and the fifth lens 35, |N4−N5|=0.264, and the following conditional expression is satisfied;

$$0.05 < |N4-N5| < 0.40 \quad (4)$$

In addition, linear thermal expansion coefficients of the first lens 31 to the fifth lens 35 are each $12 \times 10^{-6}$ [1/K] or less.

Embodiment 4

Figure 8:
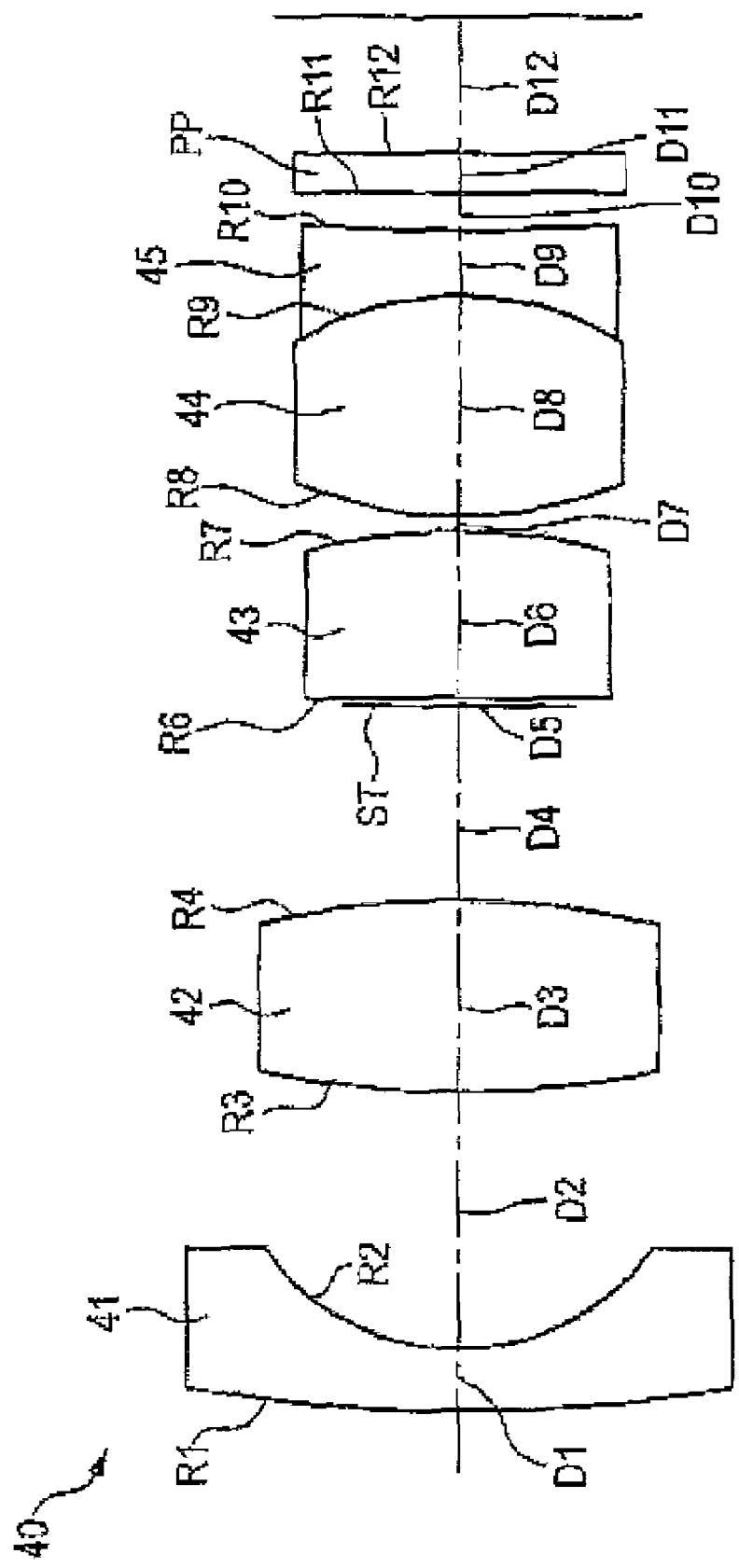
FIG. 8 is a sectional view showing a lens configuration of a fourth embodiment.
Figure 9:
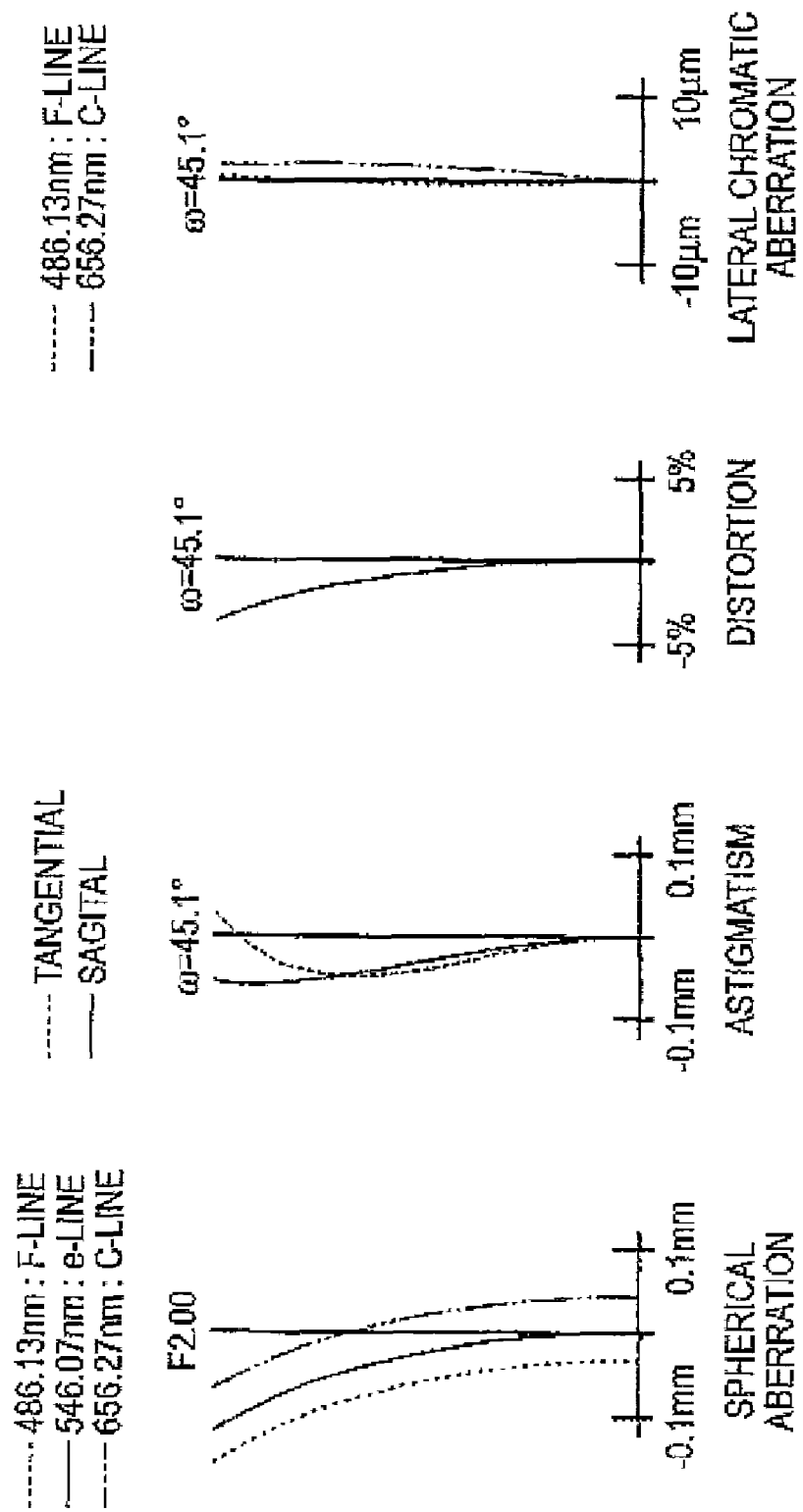
FIG. 9 are aberration diagrams of the fourth embodiment.

In FIG. 8, an imaging lens 40 includes, in order from an object side, a first lens 41 to a fifth lens 45. The first lens 41 has a negative meniscus shape with a convex surface directed to an object side and a concave surface directed to an image side thereof. The second lens 42 has a double-convex shape with convex surfaces directed to both of an object side and an image side thereof, respectively, and an absolute value of a radius of curvature of the convex surface on the image side is smaller than that on the object side. An aperture stop ST is provided between the second lens 42 and the third lens 43. The third lens 43 has a planoconvex shape with a plane directed to an object side and a convex surface directed to an image side thereof. The fourth lens 44 has a double-convex shape with convex surfaces directed to both of an object side and an image side thereof, respectively, and an absolute value of a radius of curvature of the convex surface on the image side is smaller than that on the object side. The fifth lens 45 has a double-concave shape with concave surfaces directed to both of an object side and an image side thereof, respectively, and an absolute value of a radius of curvature of the concave surface on the object side is smaller than that on the image side. The fourth lens 44 and the fifth lens 45 are cemented to each other, and a composite power of the fourth lens 44 and the fifth lens 45 is positive. Lens data of the imaging lens 40 are shown in Table 7 below, and linear thermal expansion coefficients of the first lens 41 to the fifth lens 45 are shown in Table 8 below. In addition, aberrations of the imaging lens 40 are shown in FIG. 9.

TABLE 7

(Embodiment 4)

|   | R | D | Nd | νd |
|---|---|---|---|---|
| 1 | 19.4323 | 0.82 | 1.83481 | 42.7 |
| 2 | 2.9728 | 3.39 | | |
| 3 | 12.6171 | 2.5 | 1.83481 | 42.7 |
| 4 | −11.5416 | 2.55 | | |
| ST 5 | 0 | 0.1 | | |
| 6 | 0 | 2.2 | 1.7725 | 49.6 |
| 7 | −7.2669 | 0.2 | | |
| 8 | 5.195 | 2.91 | 1.58313 | 59.4 |
| 9 | −4 | 0.85 | 1.84666 | 23.8 |
| 10 | 21.1387 | 0.5 | | |
| 11 | 0 | 0.5 | 1.5168 | 64.2 |
| 12 | 0 | 1.782 | | |
| IMG | 0 | 0 | | |

TABLE 8

| | Linear expansion coefficients | |
|---|---|---|
| | −30~70° C. $10^{-6}$ [1/K] | 100~300° C. $10^{-6}$ [1/K] |
| First lens | 6.2 | 7.6 |
| Second lens | 6.2 | 7.6 |
| Third lens | 6.2 | 7.4 |
| Fourth lens | 6.6 | 7.6 |
| Fifth lens | 8.8 | 10.4 |

In the imaging lens 40, letting a focal length of the imaging lens be F, a focal length of the third lens 43 be F3, F=3.130 mm, F3=9.362 nm, and F3/F=2.991, and the following conditional expression is satisfied:

$$1 < F3/F < 4 \quad (1)$$

From an airspace D2 between the first lens 41 and the second lens 42, D2/F=1.083, and the following conditional expression is satisfied:

$$1 < D2/F < 2 \quad (2)$$

From a space D4 from the image side surface of the second lens 42 to the aperture stop ST and a space D5 from the aperture stop ST to the third lens 43, D4/D5=25.5, and the following conditional expression is satisfied:

$$1 < D4/D5 \quad (3)$$

From refractive indexes N4, N5 relative to a d-line of the fourth lens 44 and the fifth lens 45, |N4−N5|=0.264, and the following conditional expression is satisfied:

$$0.05 < |N4-N5| < 0.40 \quad (4)$$

In addition, linear thermal expansion coefficients of the first lens 41 to the fifth lens 45 are each $12 \times 10^{-6}$ [1/K] or less.

Embodiment 5

Figure 10:
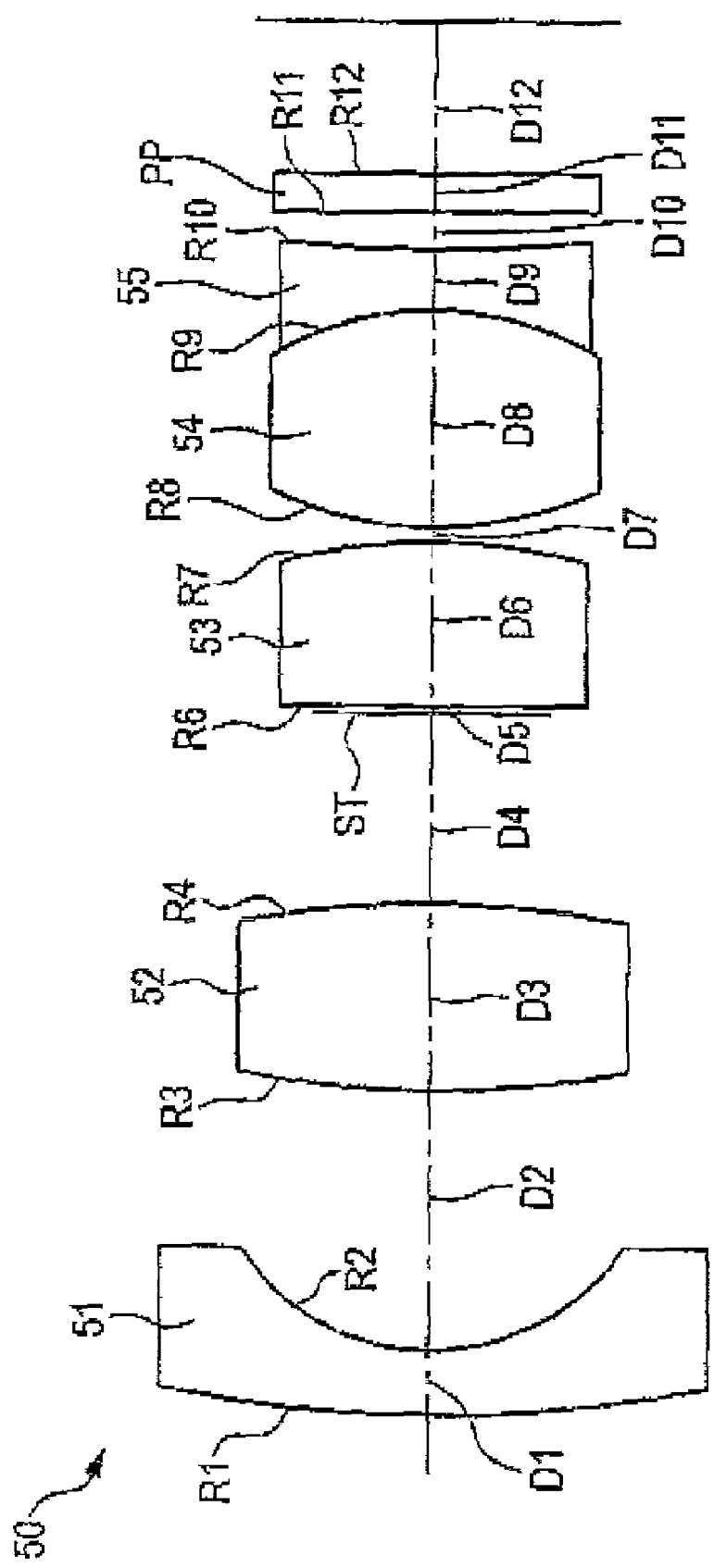
FIG. 10 is a sectional view showing a lens configuration of a firth embodiment.
Figure 11:
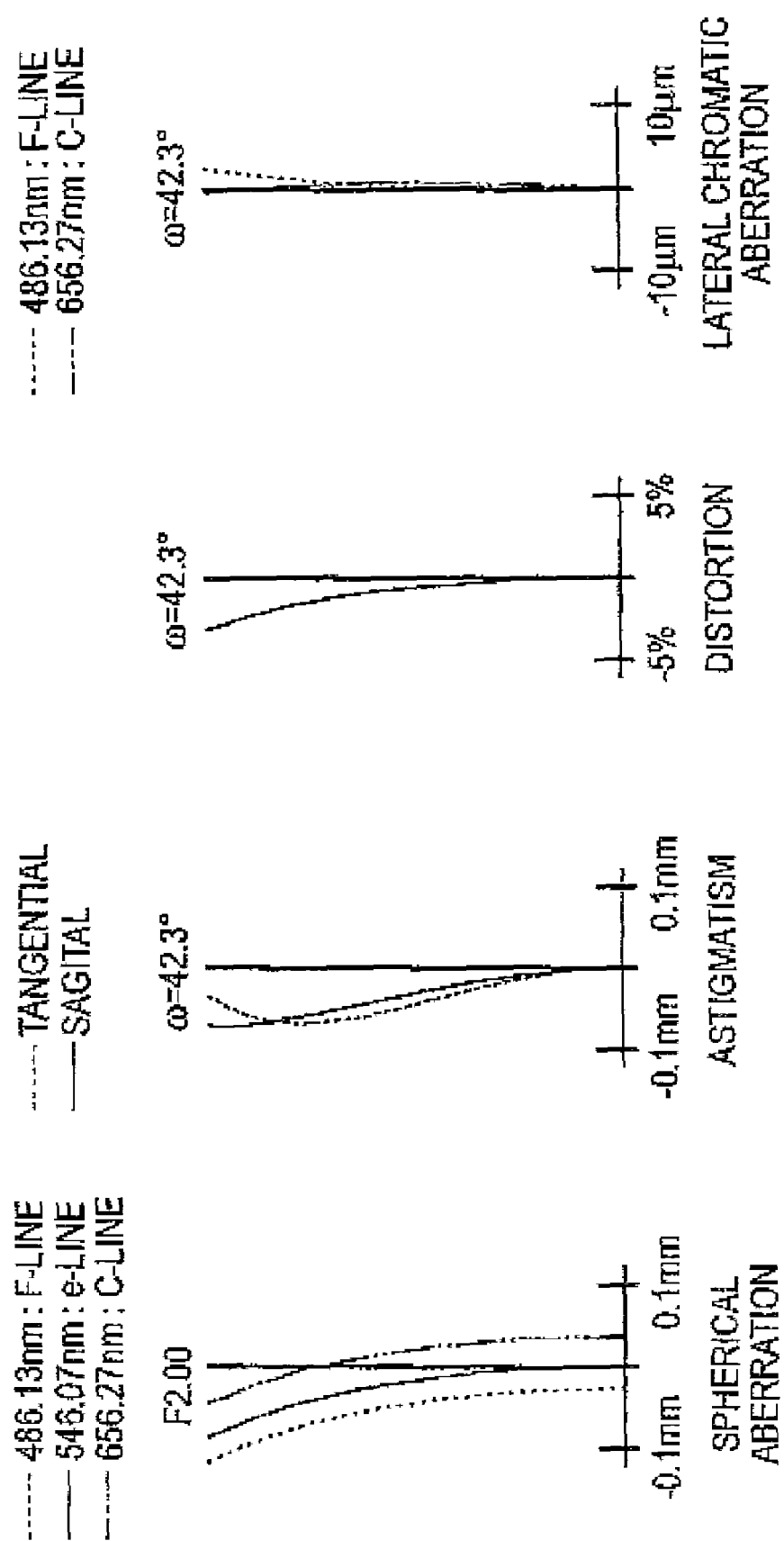
FIG. 11 are aberration diagrams of the fifth embodiment.

In FIG. 10, an imaging lens 50 includes, in order from an object side, a first lens 51 to a fifth lens 55. The first lens 51 has a negative meniscus shape with a convex surface directed to an object side and a concave surface directed to an image side thereof. The second lens 52 has a double-convex shape with convex surfaces directed to both of an object side and an image side thereof, respectively, and an absolute value of a radius of curvature of the convex surface on the image side is equal to an absolute value of a radius of curvature of the convex surface on the object side. An aperture stop ST is provided between the second lens 52 and the third lens 53. The third lens 53 has a planoconvex shape with a plane directed to an object side and a convex surface directed to an image side thereof. The fourth lens 54 has a double-convex shape with convex surfaces directed to both of an object side and an image side thereof, respectively, and an absolute value of a radius of curvature of the convex surface on the image side is smaller than that on the object side. The fifth lens 55 has a double-concave shape with concave surfaces directed to both of an object side and an image side thereof, respectively, and an absolute value of a radius of curvature of the concave surface on the object side is smaller than that on the image side. The fourth lens 54 and the fifth lens 55 are cemented to each other, and a composite power of the fourth lens 54 and the fifth lens 55 is positive. Lens data of the imaging lens 50 are shown in Table 9 below, and linear thermal expansion coefficients of the first lens 51 to the fifth lens 55 are shown in Table 10 below. In addition, aberrations of the imaging lens 50 are shown in FIG. 11.

TABLE 9

(Embodiment 5)

|    |    | R        | D    | Nd      | vd   |
|----|----|----------|------|---------|------|
|    | 1  | 18.5947  | 0.85 | 1.83481 | 42.7 |
|    | 2  | 2.9914   | 3.46 |         |      |
|    | 3  | 12.9545  | 2.50 | 1.83481 | 42.7 |
|    | 4  | -12.9545 | 2.54 |         |      |
| ST | 5  | 0        | 0.10 |         |      |
|    | 6  | 0        | 2.20 | 1.7725  | 49.6 |
|    | 7  | -7.1085  | 0.20 |         |      |
|    | 8  | 5.013    | 2.91 | 1.58313 | 59.4 |
|    | 9  | -4       | 0.80 | 1.84666 | 23.8 |
|    | 10 | 18.8589  | 0.50 |         |      |
|    | 11 | 0        | 0.50 | 1.5168  | 64.2 |
|    | 12 | 0        | 2.02 |         |      |
| IMG |   | 0        | 0    |         |      |

TABLE 10

| | Linear expansion coefficients | |
|---|---|---|
| | −30~70° C. $10^{-6}$ [1/K] | 100~300° C. $10^{-6}$ [1/K] |
| First lens | 5.8 | 7 |
| Second lens | 6.2 | 7.4 |
| Third lens | 6.2 | 7.4 |
| Fourth lens | 6.6 | 7.6 |
| Fifth lens | 8.8 | 10.4 |

In the imaging lens 50, letting a focal length of the imaging lens be F, a focal length of the third lens 53 be F3, F=3.288 mm, F3=9.158 mm, and F3/F=2.785, and the following conditional expression is satisfied:

$$1<F3/F<4 \quad (1)$$

From an airspace D2 between the first lens 51 and the second lens 52, D2/F=1.052, and the following conditional expression is satisfied:

$$0.1<D2/F<2 \quad (2)$$

From a space D4 from the image side surface of the second lens 52 to the aperture stop ST and a space D5 from the aperture stop ST to the third lens 53, D4/D5=25.4, and the following conditional expression is satisfied:

$$1<D4/D5 \quad (3)$$

From refractive indexes N4, N5 relative to a d-line of the fourth lens 54 and the fifth lens 55, |N4−N5|=0.264, and the following conditional expression is satisfied:

$$0.05<|N4-N5|<0.40 \quad (4)$$

In addition, linear thermal expansion coefficients of the first lens 51 to the fifth lens 55 are each $12\times10^{-6}$ [1/K] or less.

Embodiment 6

Figure 12:
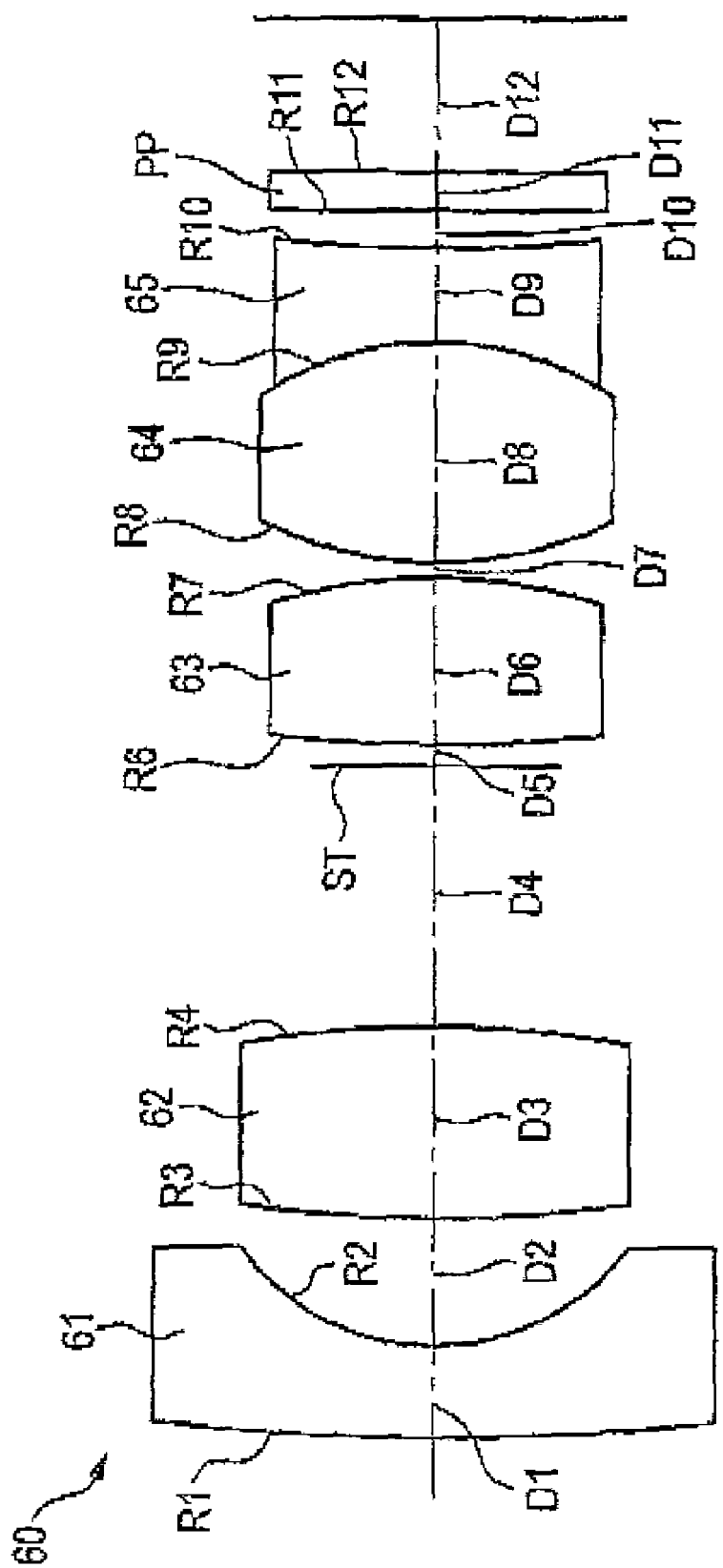
FIG. 12 is a sectional view showing a lens configuration of a sixth embodiment.
Figure 13:
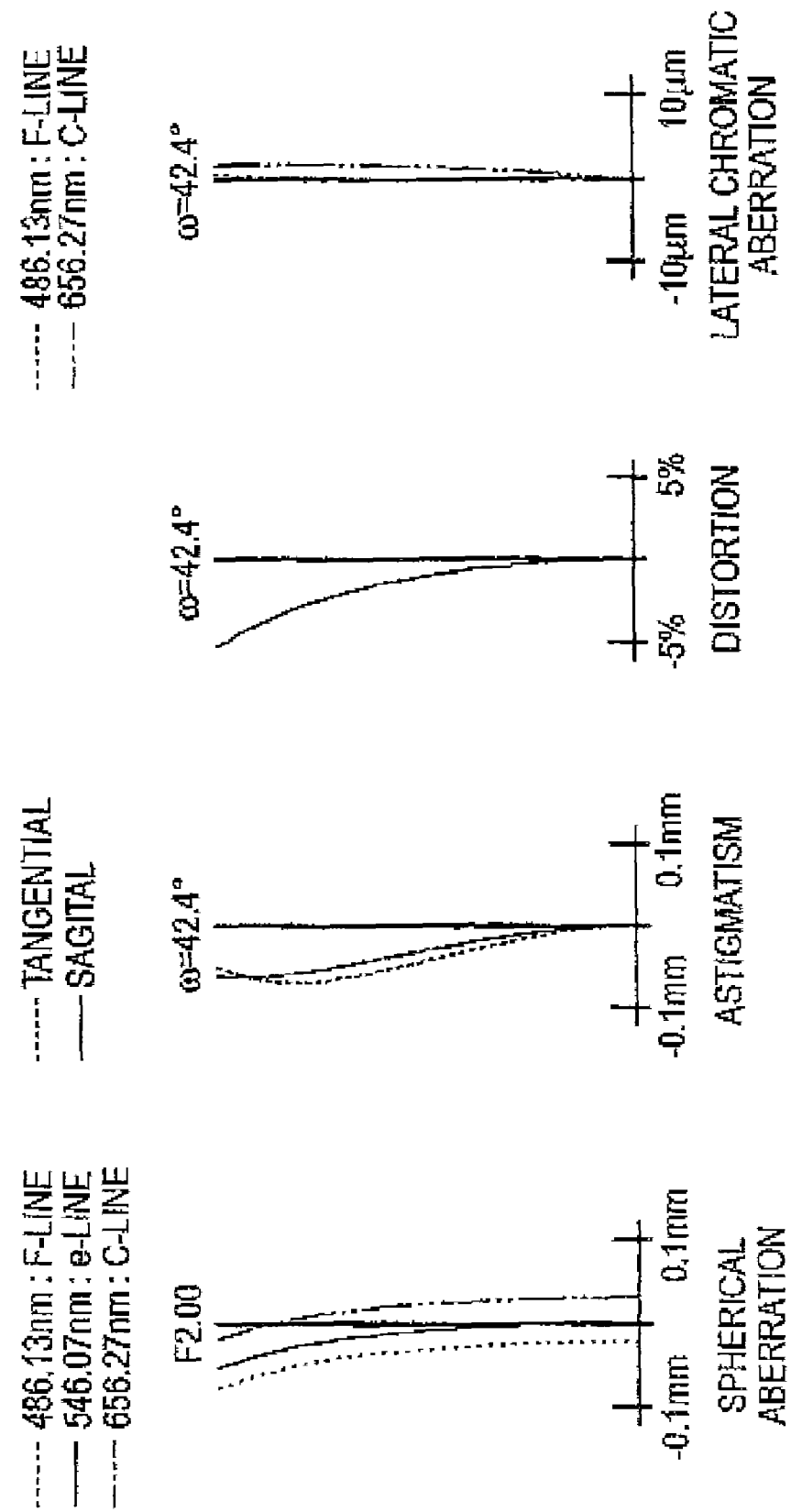
FIG. 13 are aberration diagrams of the sixth embodiment.

In FIG. 12, an imaging lens 60 includes, in order from an object side, a first lens 61 to a fifth lens 65. The first lens 61 has a negative meniscus shape with a convex surface directed to an object side and a concave surface directed to an image side thereof. The second lens 62 has a double-convex shape with convex surfaces directed to both of an object side and an image side thereof, respectively, and an absolute value of a radius of curvature of the convex surface on the image side is smaller than that on the object side. An aperture stop ST is provided between the second lens G2 and the third lens 63. The third lens 63 has a double-convex shape with convex surfaces directed to both of an object side and an image side thereof, respectively, and an absolute value of a radius of curvature of the convex surface on the image side is smaller than that on the object side. The fourth lens 64 has a double-convex shape with convex surfaces directed to both of an object side and an image side thereof, respectively, and an absolute value of a radius of curvature of the convex surface on the image side is smaller than that on the object side. The fifth lens 65 has a double-concave shape with concave surfaces directed to both of an object side and an image side thereof, respectively, and an absolute value of a radius of curvature of the concave surface on the object side is smaller than that on the image side. The fourth lens 64 and the fifth lens 65 are cemented to each other, and a composite power of the fourth lens 64 and the fifth lens 65 is positive. Lens data of the imaging lens 60 are shown in Table 11 below, and linear thermal expansion coefficients of the first lens 61 to the fifth lens 65 are shown in Table 12 below. In addition, aberrations of the imaging lens 60 are shown in FIG. 13.

TABLE 11

(Embodiment 6)

|    |    | R        | D    | Nd      | vd   |
|----|----|----------|------|---------|------|
|    | 1  | 33.3016  | 1.22 | 1.7725  | 49.6 |
|    | 2  | 3.1083   | 1.65 |         |      |
|    | 3  | 18.8037  | 2.5  | 1.83481 | 42.7 |
|    | 4  | -15.3856 | 3.44 |         |      |
| ST | 5  | 0        | 0.3  |         |      |
|    | 6  | 22.429   | 2.2  | 1.7725  | 49.6 |
|    | 7  | -6.7244  | 0.2  |         |      |
|    | 8  | 5.1429   | 2.91 | 1.58313 | 59.4 |
|    | 9  | -4       | 1.2  | 1.84666 | 23.8 |
|    | 10 | 17.5143  | 0.5  |         |      |
|    | 11 | 0        | 0.5  | 1.5168  | 64.2 |
|    | 12 | 0        | 2.007 |        |      |
| IMG |   | 0        | 0    |         |      |

TABLE 12

| | Linear expansion coefficients | |
|---|---|---|
| | −30~70° C. $10^{-6}$ [1/K] | 100~300° C. $10^{-6}$ [1/K] |
| First lens | 6.2 | 7.4 |
| Second lens | 6.2 | 7.6 |
| Third lens | 6.2 | 7.4 |
| Fourth lens | 6.6 | 7.6 |
| Fifth lens | 8.8 | 10.4 |

In the imaging lens 60, letting a focal length of the imaging lens be F, a focal length of the third lens 63 be F3, F=3.352 mm, F3=6.892 mm, and F3/F=2.056, and the following conditional expression is satisfied:

$$1<F3/F<4 \quad (1)$$

From an airspace D2 between the first lens 61 and the second lens 62, D2/F=0.49, and the following conditional expression is satisfied:

$$0.1<D2/F<2 \quad (2)$$

From a space D4 from the image side surface of the second lens 62 to the aperture stop ST and a space D5 from the aperture stop ST to the third lens 63, D4/D5=11.467, and the following conditional expression is satisfied:

$$1 < D4/D5 \quad (3)$$

From refractive indexes N4, N5 relative to a d-line of the fourth lens 64 and the fifth lens 65, |N4−N5|=0.264, and the following conditional expression is satisfied;

$$0.05 < |N4-N5| < 0.40 \quad (4)$$

In addition, linear thermal expansion coefficients of the first lens 61 to the fifth lens 65 are each $12 \times 10^{-6}$ [1/K] or less.

Embodiment 7

Figure 14:
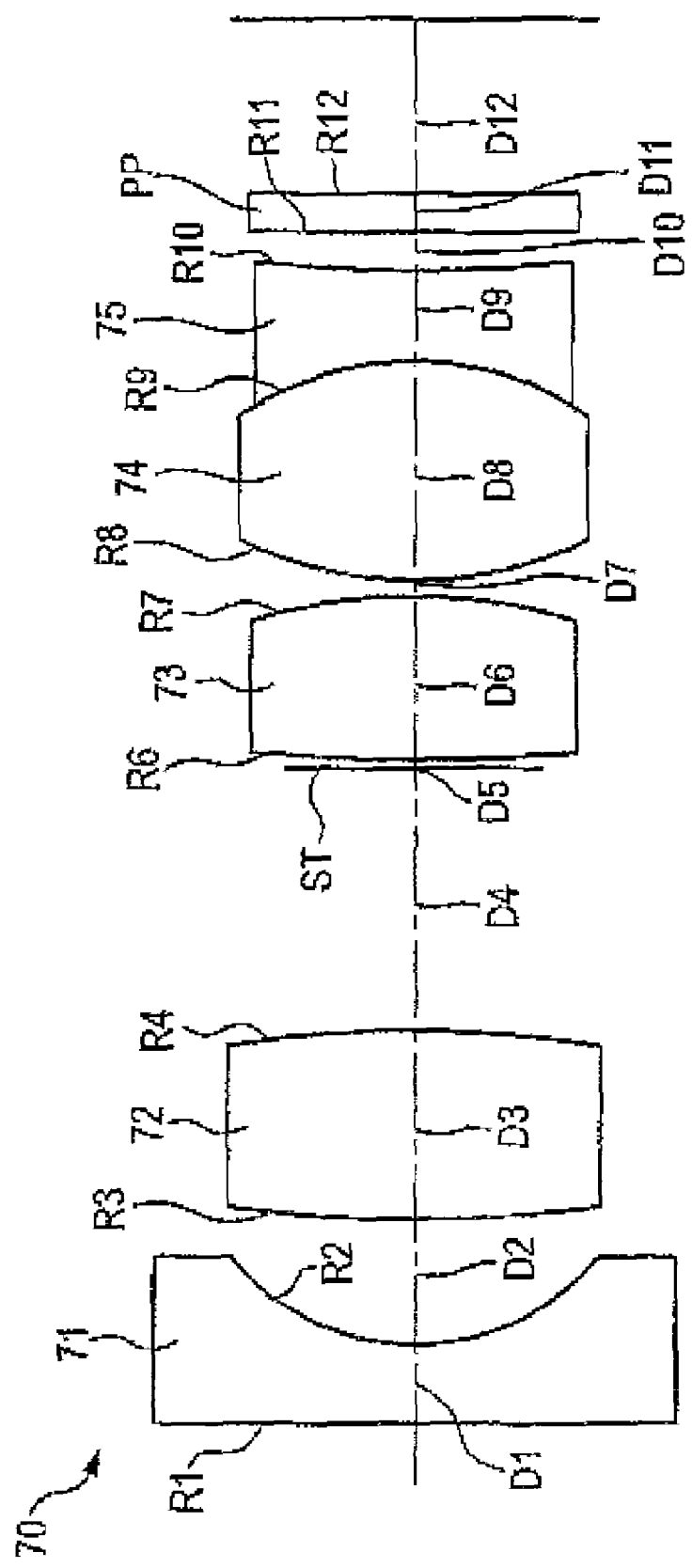
FIG. 14 is a sectional view showing a lens configuration of a seventh embodiment.
Figure 15:
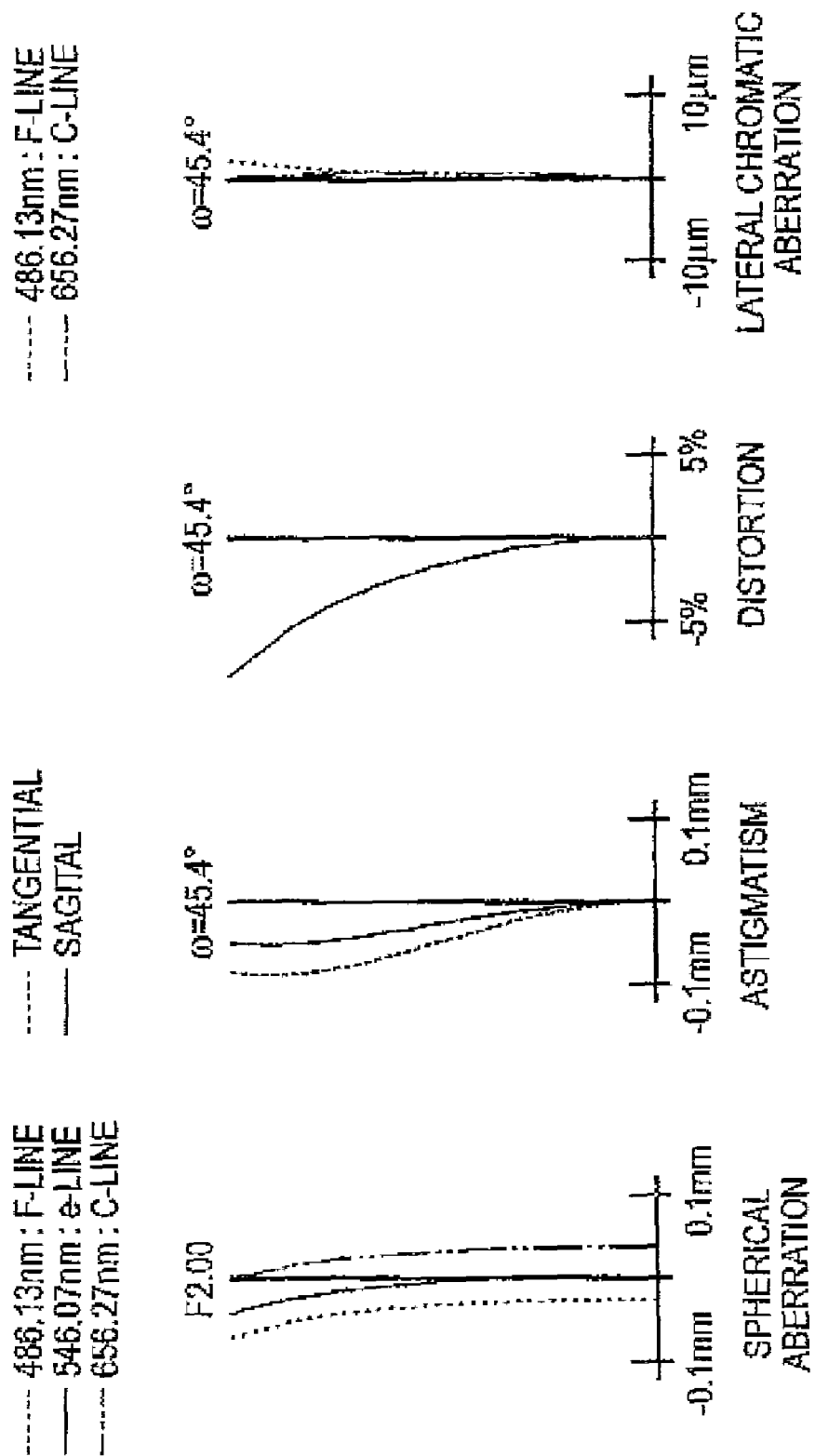
FIG. 15 are aberration diagrams of the seventh embodiment.

In FIG. 14, an imaging lens 70 includes, in order from an object side, a first lens 71 to a fifth lens 75. The first lens 71 is a negative lens which has a planoconcave shape with a plane directed to an object side and a concave surface directed to an image side thereof. The second lens 72 has a double-convex shape with convex surfaces directed to both of an object side and an image side thereof, respectively, and an absolute value of a radius of curvature of the convex surface on the image side is smaller than that on the object side. An aperture stop ST is provided between the second lens 72 and the third lens 73. The third lens 73 has a double-convex shape with convex surfaces directed to both of an object side and an image side thereof, respectively, and an absolute value of a radius of curvature of the convex surface on the image side is smaller than that on the object side. The fourth lens 74 has a double-convex shape with convex surfaces directed to both of an object side and an image side thereof, respectively, and an absolute value of a radius of curvature of the convex surface on the image side is smaller than that on the object side. The fifth lens 75 has a double-concave shape with concave surfaces directed to both of an object side and an image side thereof, respectively, and an absolute value of a radius of curvature of the concave surface on the object side is smaller than that on the image side. The fourth lens 74 and the fifth lens 75 are cemented to each other, and a composite power of the fourth lens 74 and the fifth lens 75 is positive. Lens data of the imaging lens 70 are shown in Table 13 below, and linear thermal expansion coefficients of the first lens 71 to the fifth lens 75 are shown in Table 14 below. In addition, aberrations of the imaging lens 70 are shown in FIG. 15.

TABLE 13

(Embodiment 7)

|  |  | R | D | Nd | vd |
|---|---|---|---|---|---|
|  | 1 | 0 | 1.06 | 1.7725 | 49.6 |
|  | 2 | 3.0838 | 1.66 |  |  |
|  | 3 | 18.2272 | 2.5 | 1.834 | 37.2 |
|  | 4 | −14.8918 | 3.47 |  |  |
| ST | 5 | 0 | 0.1 |  |  |
|  | 6 | 23.8273 | 2.2 | 1.7725 | 49.6 |
|  | 7 | −6.7648 | 0.2 |  |  |
|  | 8 | 5.1742 | 2.92 | 1.58313 | 59.4 |
|  | 9 | −4 | 1.2 | 1.84666 | 23.8 |
|  | 10 | 19.7848 | 0.5 |  |  |
|  | 11 | 0 | 0.5 | 1.5168 | 64.2 |
|  | 12 | 0 | 2.287 |  |  |
| IMG |  | 0 | 0 |  |  |

TABLE 14

| | Linear expansion coefficients | |
|---|---|---|
| | −30~70° C. $10^{-6}$ [1/K] | 100~300° C. $10^{-6}$ [1/K] |
| First lens | 6.2 | 7.4 |
| Second lens | 5.6 | 7.1 |
| Third lens | 6.2 | 7.4 |
| Fourth lens | 6.6 | 7.6 |
| Fifth lens | 8.8 | 10.4 |

In the imaging lens 70, letting a focal length of the imaging lens be F, a focal length of the third lens 73 be F3, F=3.234 mm, F3=7.008 mm, and F3/F=2.167, and the following conditional expression is satisfied:

$$1 < F3/F < 4 \quad (1)$$

From an airspace D2 between the first lens 71 and the second lens 72, D2/F=0.51, and the following conditional expression is satisfied;

$$0.1 < D2/F < 2 \quad (2)$$

From a space D4 from the image side surface of the second lens 72 to the aperture stop ST and a space D5 from the aperture stop ST to the third lens 73, D4/D5=34.7, and the following conditional expression is satisfied:

$$1 < D4/D5 \quad (3)$$

From refractive indexes N4, N5 relative to a d-line of the fourth lens 74 and the fifth lens 75, |N4−N5|=0.264, and the following conditional expression is satisfied:

$$0.05 < |N4-N5| < 0.40 \quad (4)$$

In addition, linear thermal expansion coefficients of the first lens 71 to the fifth lens 75 are each $12 \times 10^{-6}$ [1/K] or less.

Embodiment 8

Figure 16:
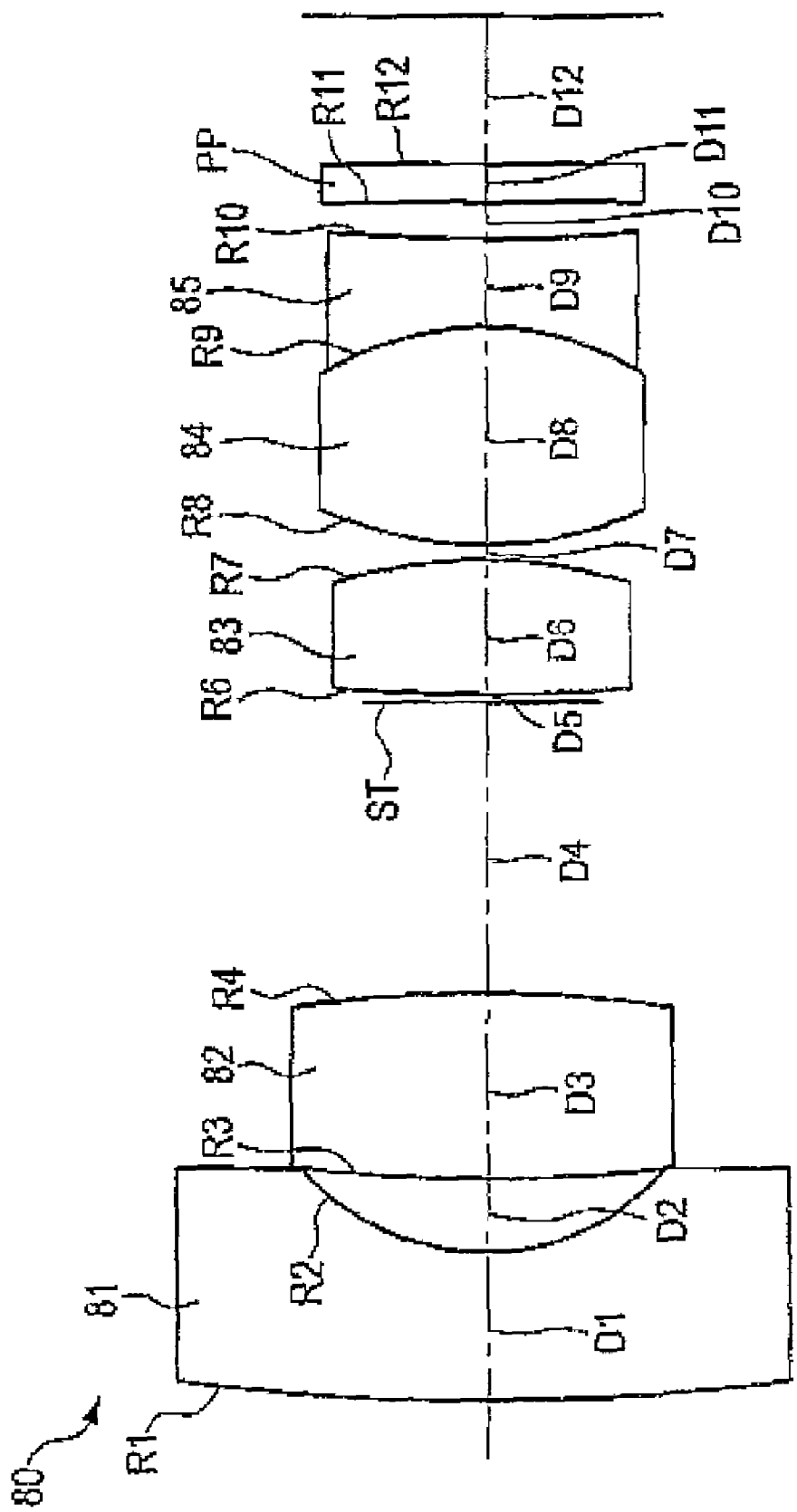
FIG. 16 is a sectional view showing a lens configuration of an eighth embodiment.
Figure 17:
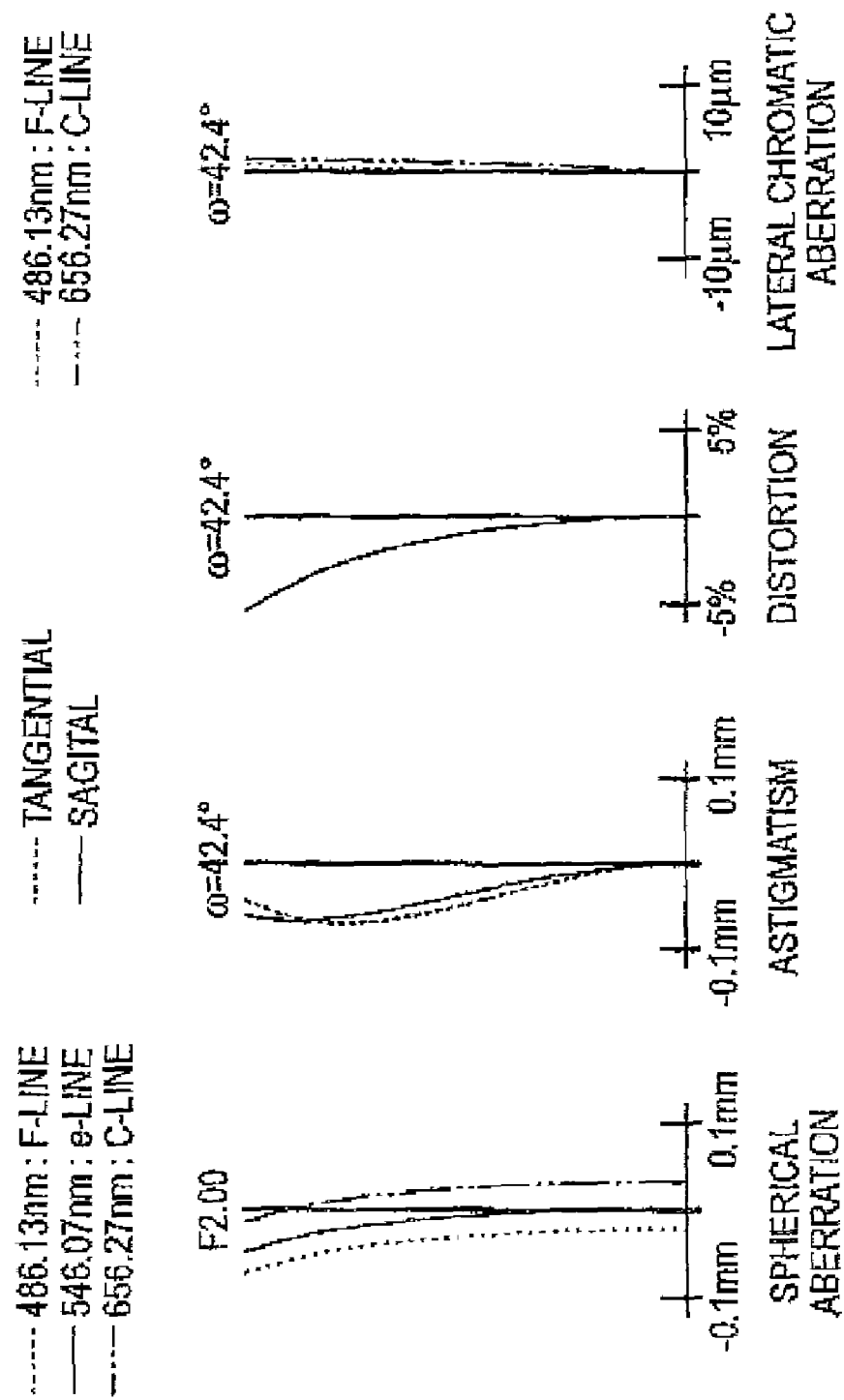
FIG. 17 are aberration diagrams of the eighth embodiment.

In FIG. 16, an Imaging Lens 80 includes, in order from an object side, a first lens 81 to a fifth lens 85. The first lens 81 has a negative meniscus shape with a convex surface directed to an object side and a concave surface directed to an image side thereof. The second lens 82 has a double-convex shape with convex surfaces directed to both of an object side and an image side thereof, respectively, and an absolute value of a radius of curvature of the convex surface on the image side is smaller than that on the object side. An aperture stop ST is provided between the second lens 82 and the third lens 83. The third lens 83 has a double-convex shape with convex surfaces directed to both of an object side and an image side thereof, respectively, and an absolute value of a radius of curvature of the convex surface on the image side is smaller than that on the object side. The fourth lens 84 has a double-convex shape with convex surfaces directed to both of an object side and an image side thereof, respectively, and an absolute value of a radius of curvature of the convex surface on the image side is smaller than that on the object side. The fifth lens 85 has a double-concave shape with concave surfaces directed to both of an object side and an image side thereof, respectively, and an absolute value of a radius of curvature of the concave surface on the object side is smaller than that on the image side. The fourth lens 84 and the fifth lens 85 are cemented to each other, and a composite power of the fourth lens 84 and the fifth lens 85 is positive. Lens data of the imaging lens 80 are shown in Table 15 below, and linear thermal expansion coefficients of the first lens 81 to the fifth lens 85 are shown in Table 16 below. In addition, aberrations of the imaging lens 80 are shown in FIG. 17.

TABLE 15

(Embodiment 8)

|    | R        | D     | Nd      | vd   |
|----|----------|-------|---------|------|
| 1  | 28.6643  | 1.98  | 1.7725  | 49.6 |
| 2  | 3.0482   | 1     |         |      |
| 3  | 20.0862  | 2.5   | 1.834   | 37.2 |
| 4  | −15.4368 | 3.91  |         |      |
| ST 5 | 0      | 0.1   |         |      |
| 6  | 23.1968  | 1.8   | 1.7725  | 49.6 |
| 7  | −6.2881  | 0.2   |         |      |
| 8  | 5.0608   | 2.91  | 1.58313 | 59.4 |
| 9  | −4       | 1.2   | 1.84666 | 23.8 |
| 10 | 23.5026  | 0.5   |         |      |
| 11 | 0        | 0.5   | 1.5168  | 64.2 |
| 12 | 0        | 1.975 |         |      |
| IMG| 0        | 0     |         |      |

TABLE 16

| | Linear expansion coefficients | |
|---|---|---|
| | −30~70° C. $10^{-6}$ [1/K] | 100~300° C. $10^{-6}$ [1/K] |
| First lens  | 6.2 | 7.4 |
| Second lens | 5.6 | 7.1 |
| Third lens  | 6.2 | 7.4 |
| Fourth lens | 6.6 | 7.6 |
| Fifth lens  | 8.8 | 10.4 |

In the imaging lens 80, letting a focal length of the imaging lens be F, a focal length of the third lens 83 be F3, F=3.359 mm, F3=6.548 mm, and F3/F=1.950, and the following conditional expression is satisfied:

$$1<F3/F<4 \quad (1)$$

From an airspace D2 between the first lens 81 and the second lens 82/, D2/F=0.298, and the following conditional expression is satisfied:

$$0.1<D2/F<2 \quad (2)$$

From a space D4 from the image side surface of the second lens 82 to the aperture stop ST and a space D5 from the aperture stop ST to the third lens 83, D4/D5=39.1, and the following conditional expression is satisfied:

$$1<D4/D5 \quad (3)$$

From refractive indexes N4, N5 relative to a d-line of the fourth lens 84 and the fifth lens 85, |N4−N5|=0.264, and the following conditional expression is satisfied:

$$0.05<|N4-N5|<0.40 \quad (4)$$

In addition, linear thermal expansion coefficients of the first lens 81 to the fifth lens 85 are each $12\times10^{-6}$ [1/K] or less.

Embodiment 9

Figure 18:
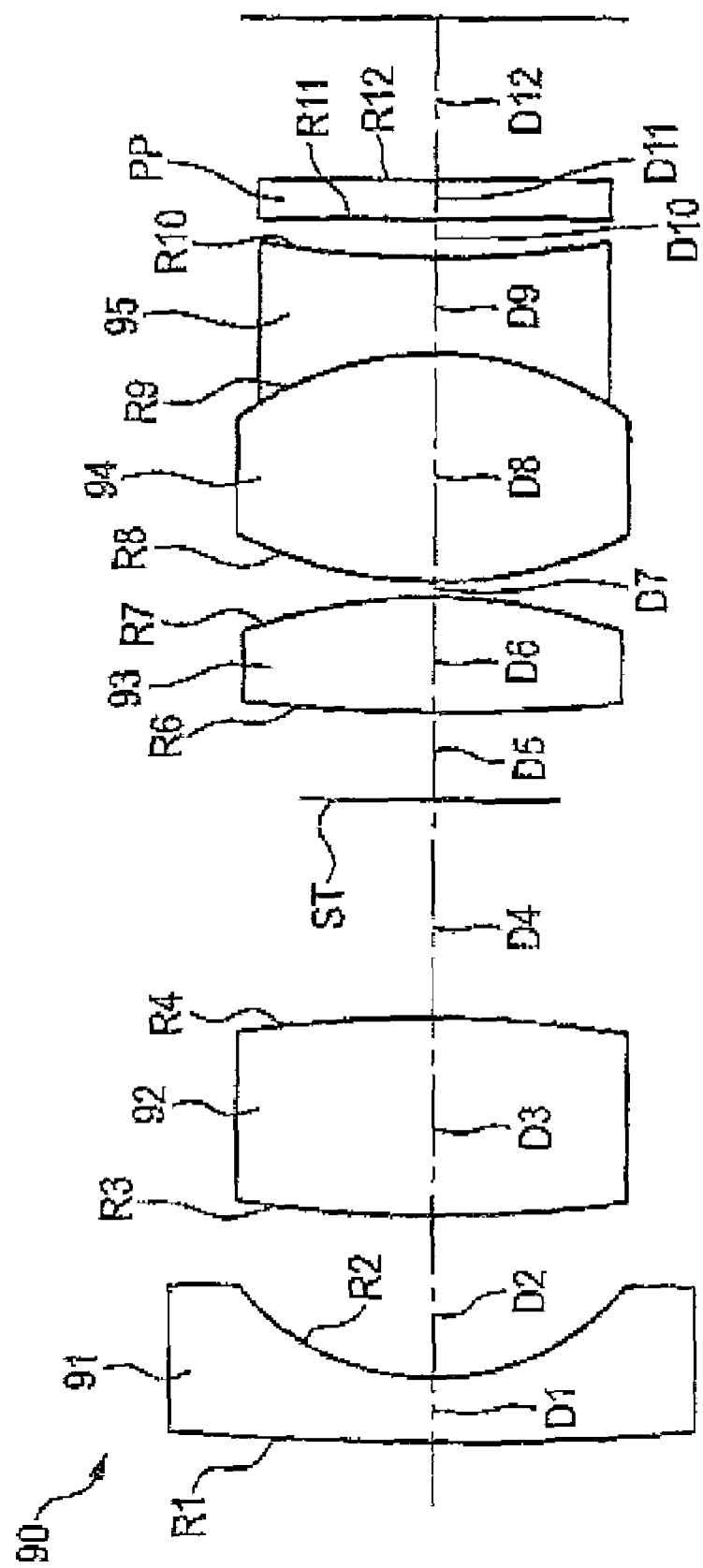
FIG. 18 is a sectional view showing a lens configuration of a ninth embodiment.
Figure 19:
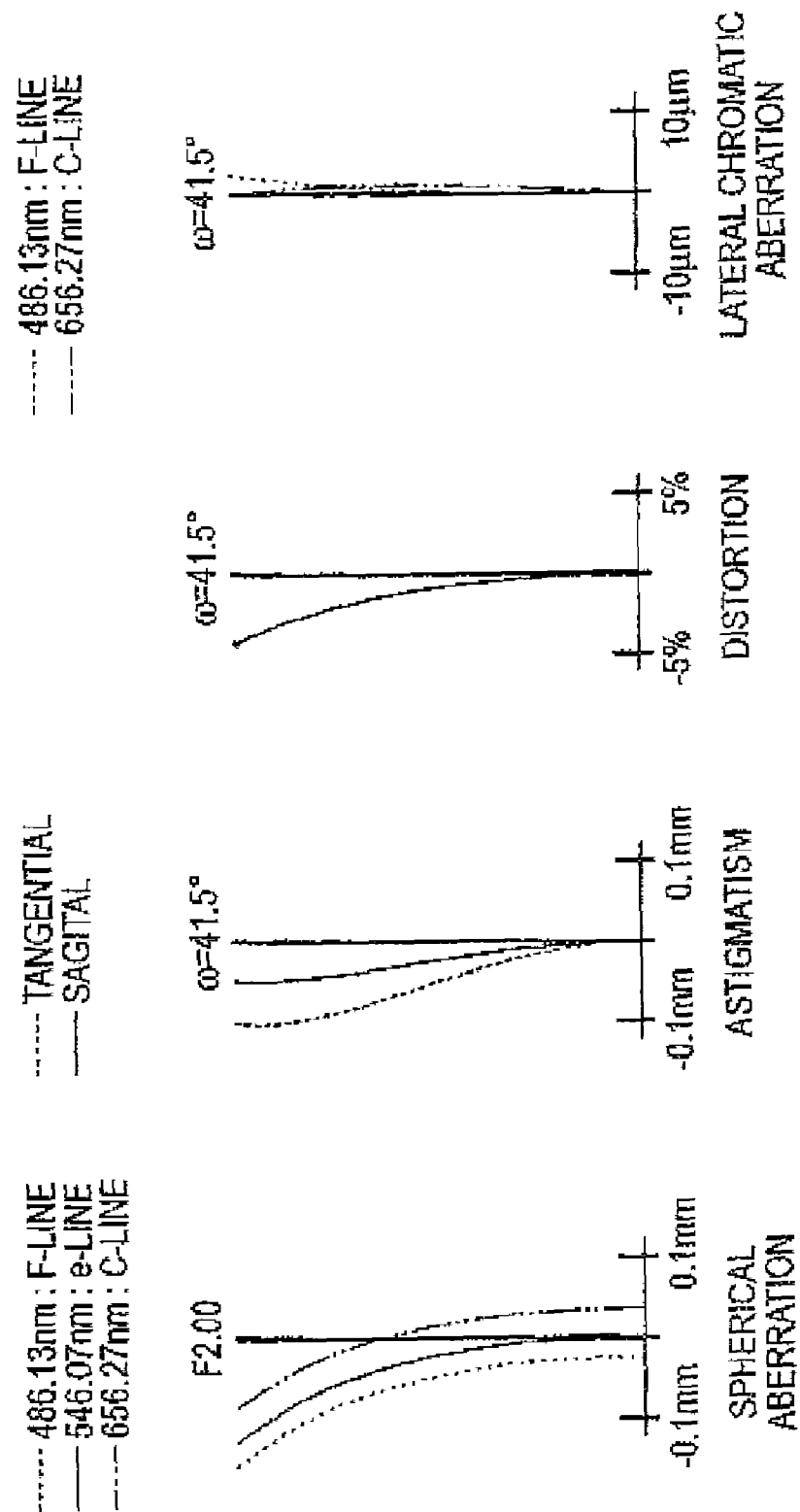
FIG. 19 are aberration diagrams of the ninth embodiment.

In FIG. 18, an imaging lens 90 includes, in order from an object side, a first lens 91 to a fifth lens 95. The first lens 91 has a negative meniscus shape with a convex surface directed to an object side and a concave surface directed to an image side thereof. The second lens 92 has a double-convex shape with convex surfaces directed to both of an object side and an image side thereof, respectively, and an absolute value of a radius of curvature of the convex surface on the image side is smaller than that on the object side. An aperture stop ST is provided between the second lens 92 and the third lens 93. The third lens 93 has a double-convex shape with convex surfaces directed to both of an object side and an image side thereof, respectively, and an absolute value of a radius of curvature of the convex surface on the image side is smaller than that on the object side. The fourth lens 94 has a double-convex shape with convex surfaces directed to both of an object side and an image side thereof, respectively, and an absolute value of a radius of curvature of the convex surface on the image side is smaller than that on the object side. The fifth lens 95 has a double-concave shape with concave surfaces directed to both of an object side and an image side thereof, respectively, and an absolute value of a radius of curvature of the concave surface on the object side is smaller than that on the image side. The fourth lens 94 and the fifth lens 95 are cemented to each other, and a composite power of the fourth lens 94 and the fifth lens 95 is positive. Lens data of the imaging lens 90 are shown in Table 27 below, and linear thermal expansion coefficients of the first lens 91 to the fifth lens 95 are shown in Table 18 below. In addition, aberrations of the imaging lens 90 are shown in FIG. 19.

TABLE 17

(Embodiment 9)

|    | R        | D     | Nd      | vd   |
|----|----------|-------|---------|------|
| 1  | 38.5457  | 0.81  | 1.7725  | 49.6 |
| 2  | 3.0125   | 2.05  |         |      |
| 3  | 17.3804  | 2.49  | 1.83481 | 42.7 |
| 4  | −13.7791 | 2.74  |         |      |
| ST 5 | 0      | 1.12  |         |      |
| 6  | 24.1723  | 1.44  | 1.7725  | 49.6 |
| 7  | −6.6651  | 0.2   |         |      |
| 8  | 5.2488   | 2.91  | 1.58313 | 59.4 |
| 9  | −4       | 1.2   | 1.84666 | 23.8 |
| 10 | 10.7122  | 0.5   |         |      |
| 11 | 0        | 0.5   | 1.5168  | 64.2 |
| 12 | 0        | 1.987 |         |      |
| IMG| 0        | 0     |         |      |

TABLE 18

| | Linear expansion coefficients | |
|---|---|---|
| | −30~70° C. $10^{-6}$ [1/K] | 100~300° C. $10^{-6}$ [1/K] |
| First lens  | 6.2 | 7.4 |
| Second lens | 6.2 | 7.6 |
| Third lens  | 6.2 | 7.4 |
| Fourth lens | 6.6 | 7.6 |
| Fifth lens  | 8.8 | 10.4 |

In the imaging lens 90, letting a focal length of the imaging lens be F, a focal length of the third lens 93 be F3, F=3.589 mm, F3=6.871 mm, and F3/F=2.028, and the following conditional expression is satisfied:

$$1<F3/F<4 \quad (1)$$

From an airspace D2 between the first lens 1 and the second lens 92, D2/F=0.605, and the following conditional expression is satisfied:

$$0.1<D2/F<2 \quad (2)$$

From a space D4 from the image side surface of the second lens 92 to the aperture stop ST and a space D5 from the aperture stop ST to the third lens 93, D4/D5=2.446, and the following conditional expression is satisfied:

$$1 < D4/D5 \qquad (3)$$

From refractive indexes N4, N5 relative to a d-line of the fourth lens 94 and the fifth lens 95, |N4−N5|=0.264, and the following conditional expression is satisfied:

$$0.05 < |N4-N5| < 0.40 \qquad (4)$$

In addition, linear thermal expansion coefficients of the first lens 91 to the fifth lens 95 are each $12 \times 10^{-6}$ [1/K] or less.

Embodiment 10

Figure 20:
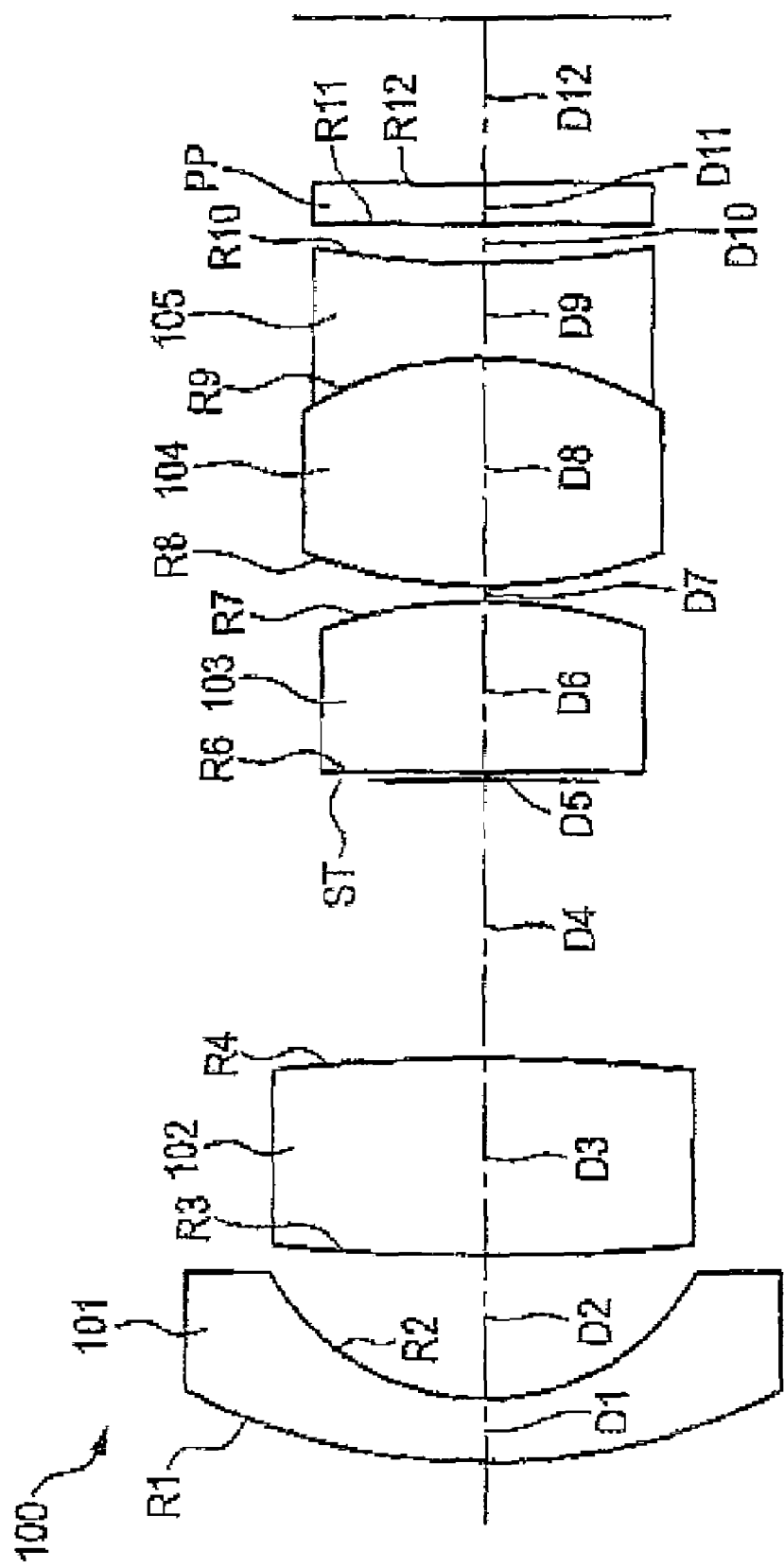
FIG. 20 is & sectional view showing a lens configuration of a tenth embodiment.
Figure 21:
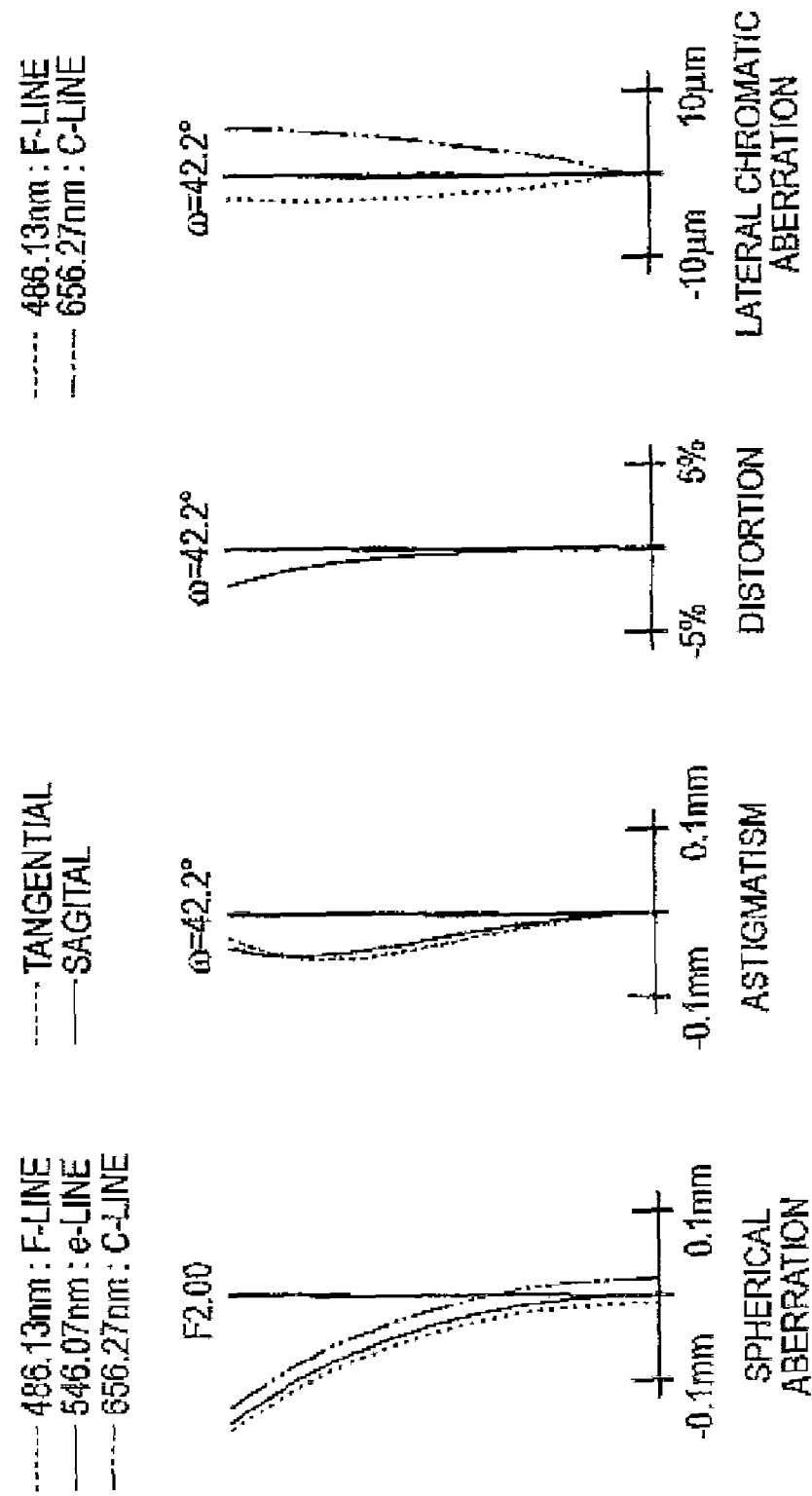
FIG. 21 are aberration diagrams of the tenth embodiment.

In FIG. 20, an Imaging Lens 100 includes, in Order from an Object side, a first lens 101 to a fifth lens 105. The first lens 101 has a negative meniscus shape with a convex surface directed to an object side and a concave surface directed to an image side thereof. The second lens 102 has a double-convex shape with convex surfaces directed to both of an object side and an image side thereof, respectively, and an absolute value of a radius of curvature of the convex surface on the image side is smaller than that on the object side. An aperture stop ST is provided between the second lens 102 and the third lens 103. The third lens 103 has a planoconvex shape with a plane directed to an object side and a convex surface directed to an image side thereof. The fourth lens 104 has a double-convex shape with convex surfaces directed to both of an object side and an image side thereof, respectively, and an absolute value of a radius of curvature of the convex surface on the image side is smaller than that on the object side. The fifth lens 105 has a double-concave shape with concave surfaces directed to both of an object side and an image side thereof, respectively, and an absolute value of a radius of curvature of the concave surface on the object side is smaller than that on the image side. The fourth lens 104 and the fifth lens 105 are cemented to each other, and a composite power of the fourth lens 104 and the fifth lens 105 is positive. Lens data or the imaging lens 100 are shown in Table 19 below, and linear thermal expansion coefficients of the first lens 101 to the fifth lens 105 are shown in Table 20 below. In addition, aberrations of the imaging lens 100 are Shown in FIG. 21.

TABLE 19

(Embodiment 10)

|    |    | R        | D     | Nd      | vd   |
|----|----|----------|-------|---------|------|
|    | 1  | 8.0526   | 0.81  | 1.883   | 40.8 |
|    | 2  | 2.9856   | 1.82  |         |      |
|    | 3  | 26.8208  | 2.5   | 1.83481 | 42.7 |
|    | 4  | −23.7677 | 3.54  |         |      |
| ST | 5  | 0        | 0.1   |         |      |
|    | 6  | 0        | 2.2   | 1.7725  | 49.6 |
|    | 7  | −5.7671  | 0.2   |         |      |
|    | 8  | 6.0622   | 2.91  | 1.7725  | 49.6 |
|    | 9  | −4.0001  | 1.2   | 1.84666 | 23.8 |
|    | 10 | 11.2103  | 0.5   |         |      |
|    | 11 | 0        | 0.5   | 1.5168  | 64.2 |
|    | 12 | 0        | 2.088 |         |      |
| IMG|    | 0        | 0     |         |      |

TABLE 20

|             | Linear expansion coefficients | |
|---|---|---|
|             | −30~70° C. $10^{-6}$ [1/K] | 100~300° C. $10^{-6}$ [1/K] |
| First lens  | 6.6 | 7.8 |
| Second lens | 6.2 | 7.6 |
| Third lens  | 6.2 | 7.4 |
| Fourth lens | 6.6 | 7.6 |
| Fifth lens  | 8.8 | 10.4 |

In the imaging lens 100, letting a focal length of the imaging lens be F, a focal length of the third lens 103 be F3, F=3.263 mm, F3=7.430 mm, and F3/F=2.277, and the following conditional expression is satisfied:

$$1 < F3/F < 4 \qquad (1).$$

From an airspace D2 between the first lens 101 and the second lens 102, D2/F=0.558, and the following conditional expression is satisfied:

$$0.1 < D2/F < 2 \qquad (2)$$

From a space D4 from the image side surface of the second Lens 102 to the aperture stop ST and a space D5 from the aperture stop ST to the third lens 103, D4/D5=35.4, and the following conditional expression is satisfied:

$$1 < D4/D5 \qquad (3)$$

From refractive indexes N4, N5 relative to a d-line of the fourth lens 104 and the fifth lens 105, |N4−N5|=0.074, and the following conditional expression is satisfied:

$$0.05 < |N4-N5| < 0.40 \qquad (4)$$

In addition, linear thermal expansion coefficients of the first lens 101 to the fifth lens 105 are each $12 \times 10^{-6}$ [1/K] or less.

Embodiment 11

Figure 22:
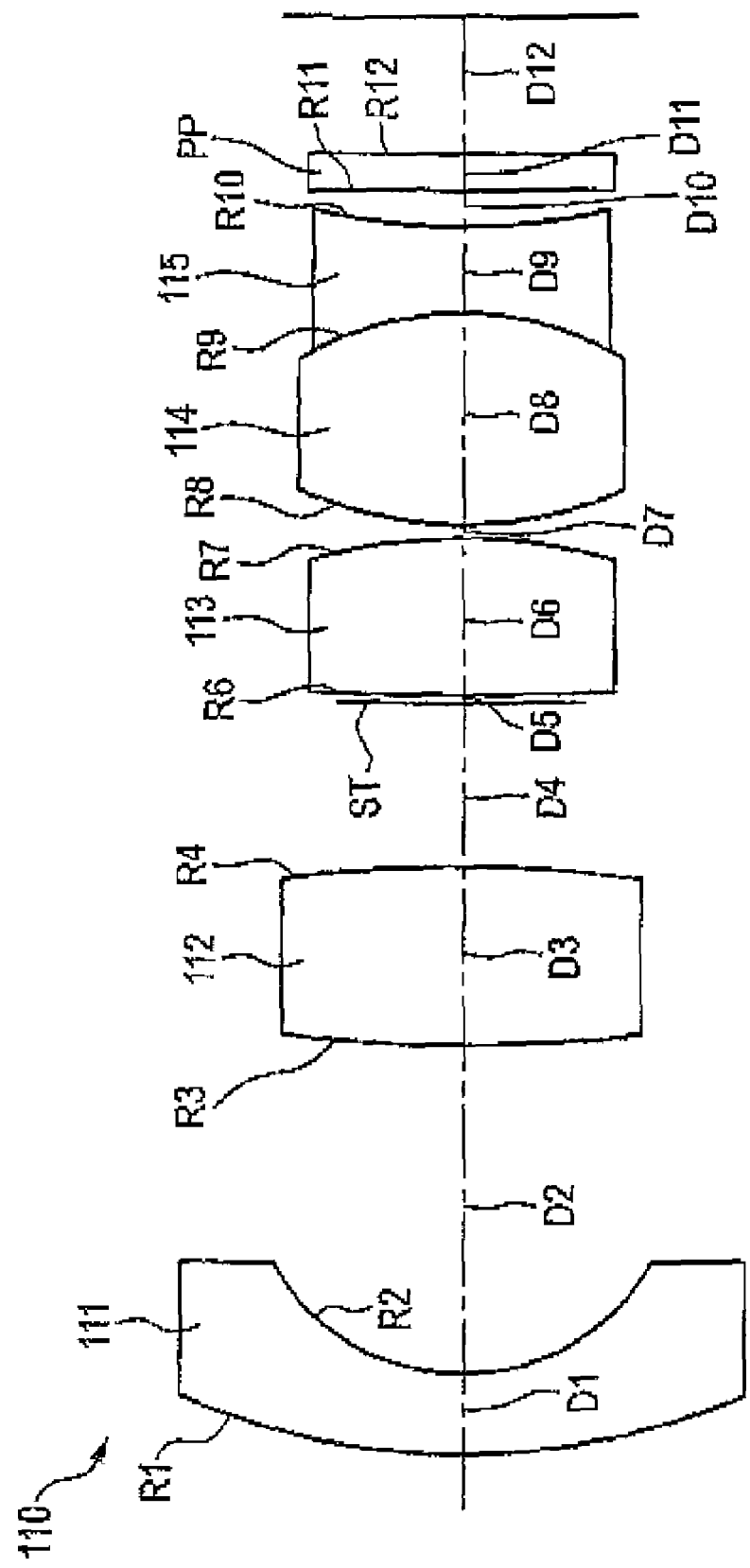
FIG. 22 is a sectional view showing a lens configuration of an eleventh embodiment.
Figure 23:
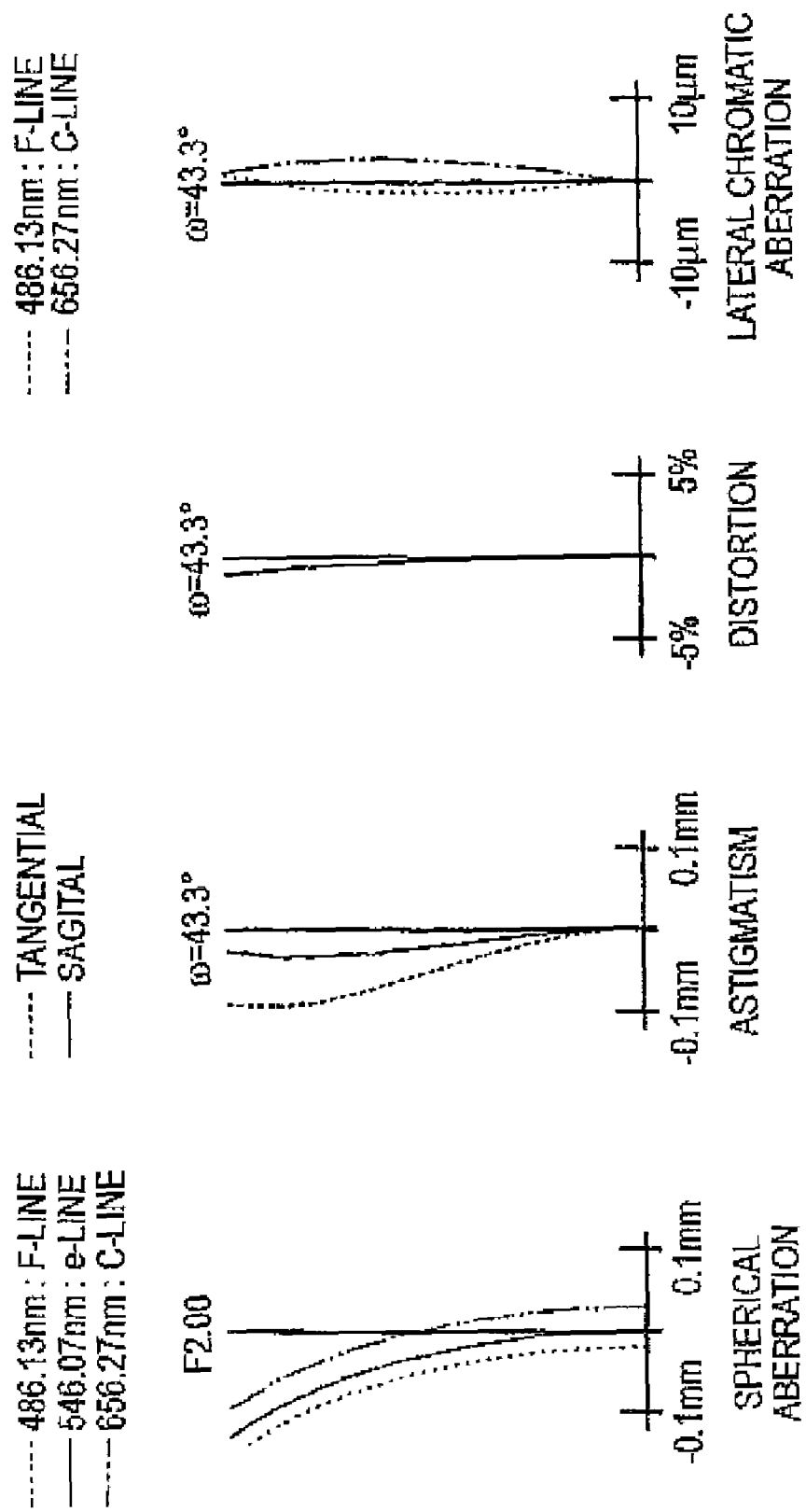
FIG. 23 are aberration diagrams of the eleventh embodiment.

In FIG. 22, an imaging lens 110 includes, in order from an object side, a first lens 111 to a fifth lens 115. The first lens 111 has a negative meniscus shape with a convex surface directed to an object side and a concave surface directed to an image side thereof. The second lens 112 has a double-convex shape with convex surfaces directed to both of an object side and an image side thereof, respectively, and an absolute value of a radius of curvature of the convex surface on the image side is smaller than that on the object side. An aperture stop ST is provided between the second lens 112 and the third lens 113. The third lens 113 has a double-convex shape with convex surfaces directed to both of an object side and an image side thereof, respectively, and an absolute value of a radius of curvature of the convex surface on the image side is smaller than that on the object side. The fourth lens 114 has a double-convex shape with convex surfaces directed to both of an object side and an image side thereof, respectively, and an absolute value of a radius of curvature of the convex surface on the image side is smaller than that on the object side. The fifth lens 115 has a double-concave shape with concave surfaces directed to both of an object side and an image side thereof, respectively, and an absolute value of a radius of curvature of the concave surface or the object side is smaller than that on the image side. The fourth lens 114 and the fifth lens 115 are cemented to each other, and a composite power of the fourth lens 114 and the fifth lens 115 is positive, Lens data of the imaging lens 110 are shown in Table 21 below, and linear thermal expansion coefficients of the first lens 111 to the fifth lens 115 are shown in Table 22 below. In addition, aberrations of the imaging lens 110 are shown in FIG. 23.

TABLE 21

(Embodiment 11)

|     |     | R        | D     | Nd     | vd   |
|-----|-----|----------|-------|--------|------|
|     | 1   | 9.2652   | 1.12  | 1.883  | 40.8 |
|     | 2   | 2.87     | 4.53  |        |      |
|     | 3   | 21.307   | 2.5   | 1.816  | 46.6 |
|     | 4   | −15.9941 | 2.26  |        |      |
| ST  | 5   | 0        | 0.1   |        |      |
|     | 6   | 40.3655  | 2.18  | 1.7725 | 49.6 |
|     | 7   | −7.2967  | 0.2   |        |      |
|     | 8   | 5.2454   | 2.91  | 1.6228 | 57.1 |
|     | 9   | −4       | 1.2   | 1.84666| 23.8 |
|     | 10  | 8.7445   | 0.5   |        |      |
|     | 11  | 0        | 0.5   | 1.5168 | 64.2 |
|     | 12  | 0        | 1.887 |        |      |
| IMG |     | 0        | 0     |        |      |

TABLE 22

| | Linear expansion coefficients | |
|---|---|---|
| | −30~70° C. $10^{-6}$ [1/K] | 100~300° C. $10^{-6}$ [1/K] |
| First lens | 6.6 | 7.8 |
| Second lens | 6.3 | 7.6 |
| Third lens | 6.2 | 7.4 |
| Fourth lens | 6.5 | 7.6 |
| Fifth lens | 8.8 | 10.4 |

In the imaging lens 110, letting a focal length of the imaging lens be F, a focal length of the third lens 113 be F3, F=3.142 mm, F3=8.124 mm, and F3/F=2.585, and the following conditional expression on is satisfied:

$$1 < F3/F < 4 \quad (1)$$

From an airspace D2 between the first lens 111 and the second lens 112, D2/F=1.442, and the following conditional expression is satisfied:

$$0.1 < D2/F < 2 \quad (2)$$

From a space D4 from the image side surface of the second lens 112 to the aperture stop ST and a space D5 from the aperture stop ST to the third lens 113, D4/D5=22.6, and the following conditional expression is satisfied;

$$1 < D4/D5 \quad (3)$$

From refractive indexes N4, N5 relative to a d-line of the fourth lens 114 and the fifth lens 115, |N4−N5|=0.224, and the following conditional expression is satisfied;

$$0.05 < |N4-N5| < 0.40 \quad (4)$$

In addition, linear thermal expansion coefficients of the first lens 111 to the fifth lens 115 are each $12 \times 10^{-6}$ [1/K] or less.

Embodiment 12

Figure 24:
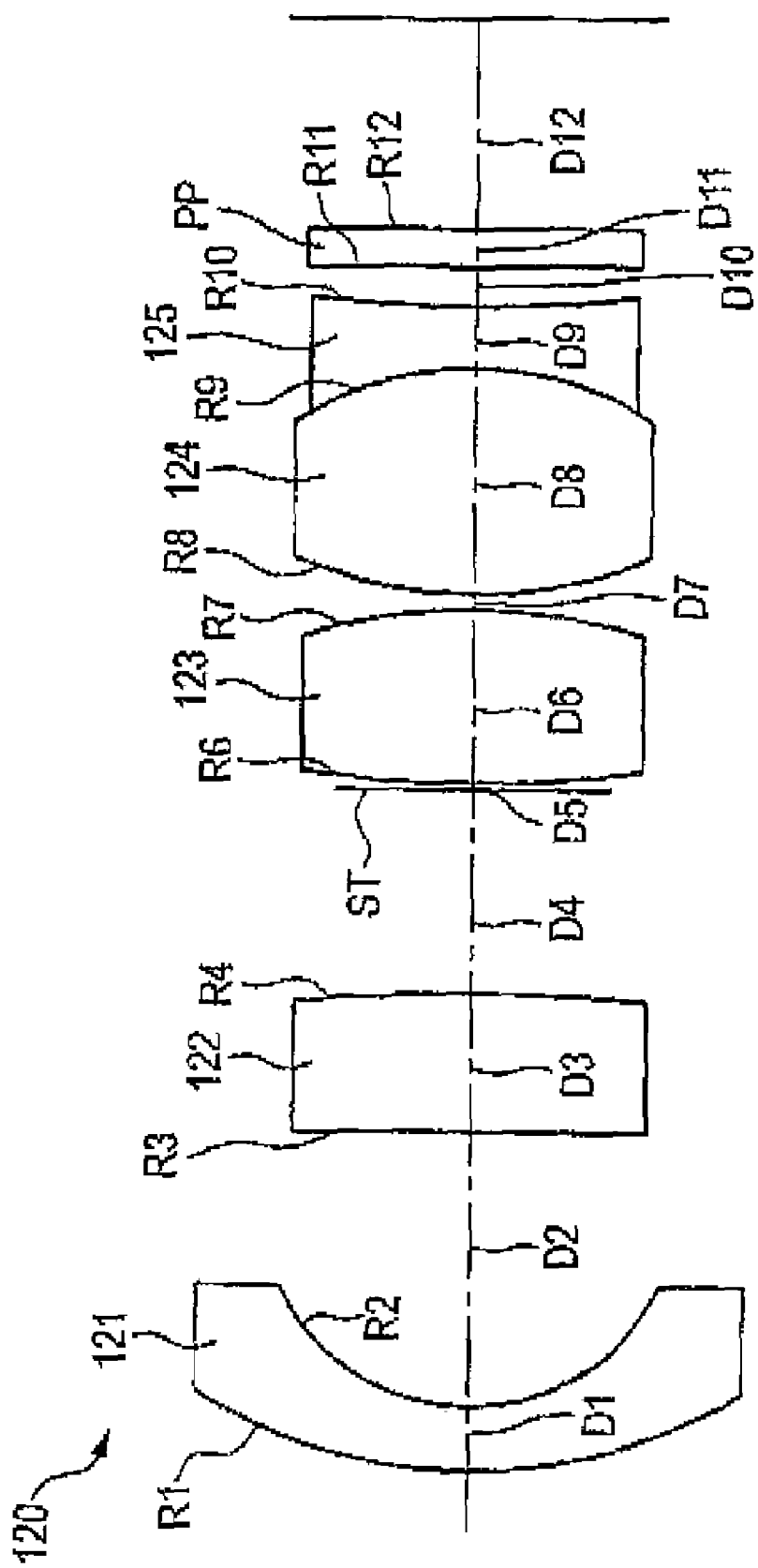
FIG. 24 is a sectional view showing a lens configuration of a twelfth embodiment.
Figure 25:
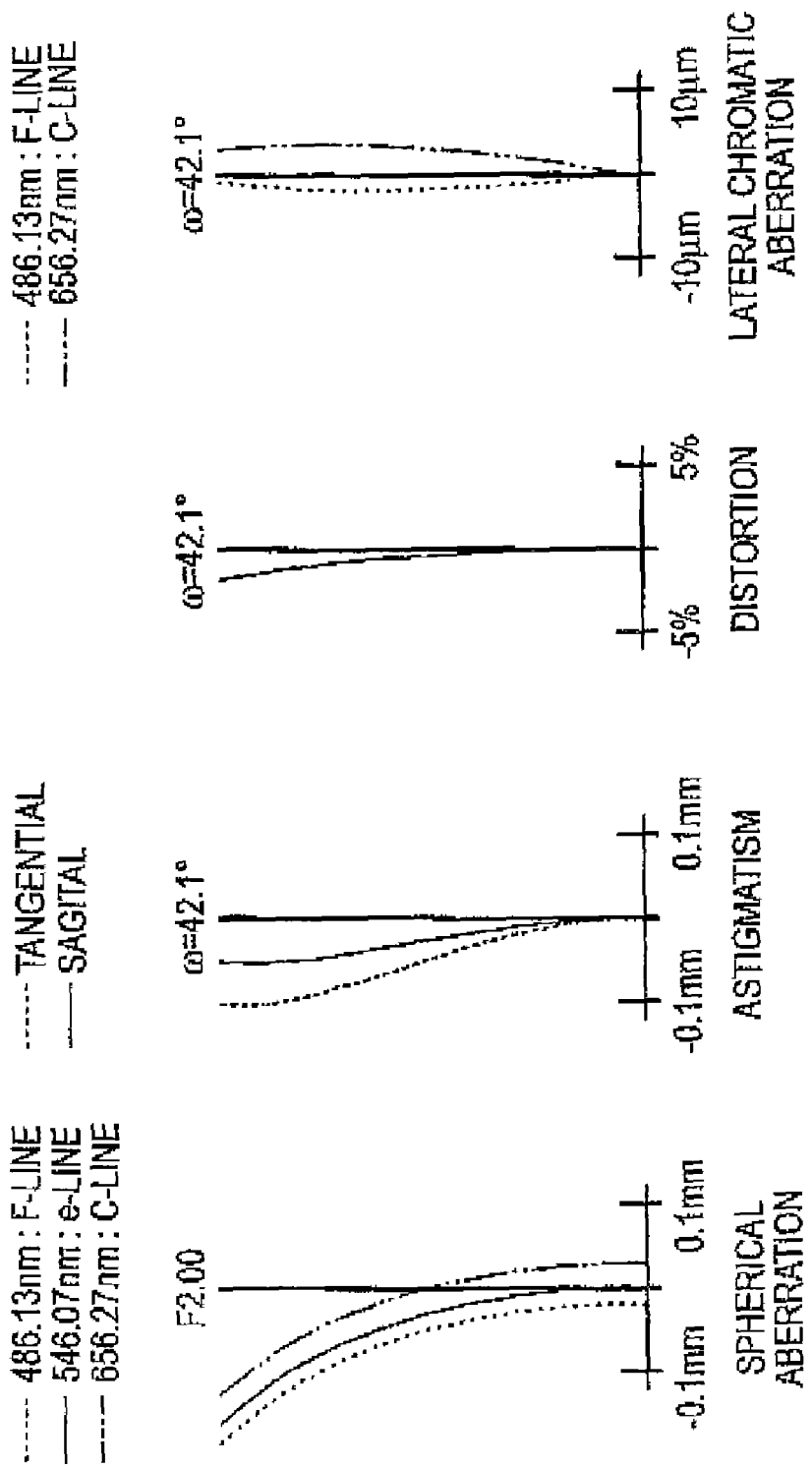
FIG. 25 are aberration diagrams of the twelfth embodiment.

In FIG. 24, an imaging lens 120 includes, in order from an object side, a first lens 121 to a fifth lens 125. The first lens 121 has a negative meniscus shape with a convex surface directed to an object side and a concave surface directed to an image side thereof. The second lens 122 has a positive meniscus shape with a concave surface directed to an object side and a convex surface directed to an image side thereof. An aperture stop ST is provided between the second lens 122 and the third lens 123. The third lens 123 has a double-convex shape with convex surfaces directed to both of an object side and an image side thereof, respectively, and an absolute value of a radius of curvature of the convex surface on the image side is smaller than that on the object side. The fourth lens 124 has a double-convex shape with convex surfaces directed to both of an object side and an image side thereof, respectively, and an absolute value of a radius of curvature of the convex surface on the image side is smaller than that on the object side. The fifth lens 125 has a double-concave shape with concave surfaces directed to both of an object side and an image side thereof, respectively, and an absolute value of a radius of curvature of the concave surface on the object side is smaller than that on the image side. The fourth lens 124 and the fifth lens 125 are cemented to each other, and a composite power of the fourth lens 124 and the fifth lens 125 is positive. Lens data of the imaging lens 120 are shown in Table 23 below, and linear thermal expansion coefficients of the first lens 121 to the fifth lens 125 are shown in Table 24 below. In addition, aberrations of the imaging lens 120 are shown in FIG. 25.

TABLE 23

(Embodiment 12)

|     |     | R        | D     | Nd      | vd   |
|-----|-----|----------|-------|---------|------|
|     | 1   | 6.5564   | 0.80  | 1.83481 | 42.7 |
|     | 2   | 2.6051   | 3.55  |         |      |
|     | 3   | −98.26   | 1.79  | 1.83481 | 42.7 |
|     | 4   | −18.956  | 2.60  |         |      |
| ST  | 5   | 0        | 0.10  |         |      |
|     | 6   | 16.1605  | 2.20  | 1.7725  | 49.6 |
|     | 7   | −6.7361  | 0.20  |         |      |
|     | 8   | 5.5592   | 2.91  | 1.58313 | 59.4 |
|     | 9   | −4       | 0.80  | 1.84666 | 23.8 |
|     | 10  | 18.2799  | 0.50  |         |      |
|     | 11  | 0        | 0.50  | 1.5168  | 64.2 |
|     | 12  | 0        | 2.648 |         |      |
| IMG |     | 0        | 0     |         |      |

TABLE 24

| | Linear expansion coefficients | |
|---|---|---|
| | −30~70° C. $10^{-6}$ [1/K] | 100~300° C. $10^{-6}$ [1/K] |
| First lens | 6.2 | 7.6 |
| Second lens | 6.2 | 7.6 |
| Third lens | 6.2 | 7.4 |
| Fourth lens | 6.6 | 7.6 |
| Fifth lens | 8.8 | 10.4 |

In the imaging lens 120, letting a focal length of the imaging lens be F, a focal length of the third lens 123 be F3, F=3.258 mm, F3=6.394 mm, and F3/F=1.963, and the following conditional expression is satisfied:

$$1 < F3/F < 4 \quad (1)$$

From an airspace D2 between the first lens 121 and the second lens 122, D2/F=1.089, and the following conditional expression is satisfied:

$$0.1 < D2/F < 2 \quad (2)$$

From a space D4 from the image side surface of the second lens 122 to the aperture stop ST and a space D5 from the aperture stop ST to the third lens 123, D4/D5=26.0, and the following conditional expression is satisfied:

$$1 < D4/D5 \quad (3)$$

From refractive indexes N4, N5 relative to a d-line of the fourth lens 124 and the fifth lens 125, |N4−N5|=0.264, and the following conditional expression is satisfied:

$$0.05 < |N4-N5| < 0.40 \quad (4)$$

In addition, linear thermal expansion coefficients of the first lens 121 to the fifth lens 125 are each $12 \times 10^{-6}$ [1/K] or less.

While in the embodiments, all the lenses are made up of the glass spherical lenses, by utilizing glass aspherical lenses and plastic aspherical lenses the aberrations can be corrected properly. In the event that glass aspherical lenses are used a high-performance imaging lens can be realized which provides superior weathering resistance and thermal expansion resistance which are required for onboard cameras. In particular, by making up all the lenses of a plastic material a reduction in production cost can be realized, and an imaging lens can be obtained in which aberrations are corrected properly and which is, hence, suitable for camera systems which include not only onboard cameras but also mobile telephone cameras, monitor cameras and endoscopes.

Since the onboard camera is used under the sever environments where it is exposed to wind, rain and direct sun light, the onboard camera is required to have superior water resistance and weathering resistance such as acids resistance, as well as strong resistances to fats and oils and chemicals such as detergents. In the onboard camera, materials which have superior water resistance and acids resistance are good to be used for, in particular, the first lens which lies nearest to objects. Specifically, on water resistance [RW(p)] and acid resistance [RA(p)] standards provided by GLASS MANUFACTURERS' ASSOCIATION OF JAPAN, a material is desirable which has a resistance to water classified as first to third grades and a resistance to acids classified as first to fourth grades both based on the powder method. A material is more preferable which has a resistance to water and a resistance to acids both classified as the second grade or higher based on the powder method.

According to the invention, it is possible to obtain a high-performance imaging lens in which a bright f number of f/2.0 is attained, field curvature is corrected properly and a wide angle of view is obtained which provides a semi-angle of view of 40 degrees or more. In addition, an imaging lens can be realized which has superior weathering resistance and thermal expansion resistance and which is suitable for onboard cameras, monitor cameras and the like which are used under severe environments.

The entire disclosure of each and every foreign patent application from which the benefit of foreign priority has been claimed in the present application is incorporated herein by reference, as if fully set forth.

What is claimed is:

1. An imaging lens comprising, in order from an object side:
   a first lens having a negative refractive power with a concave surface directed to an image side thereof;
   a second lens having a positive refractive power with a convex surface directed to an image side thereof and having an absolute value of a radius of curvature on the image side is equal to or smaller than that on an object side thereof;
   a stop;
   a third lens which is a planoconvex lens having a plane on an object side thereof or a double-convex lens having on an object side thereof a surface of which an absolute value of a radius of curvature is larger than that on an image side thereof; and
   a compound lens of a fourth lens and a fifth lens, the compound lens having a positive composite power,
   wherein the second lens is a double-convex lens, and
   the number of lenses of the imaging lense is five.

2. The imaging lens as set forth in claim 1,
   wherein the fourth lens is a double-convex lens.

3. The imaging lens as set forth in claim 2,
   wherein letting a focal length of the imaging lens be F, a focal length of the third lens be F3, and an airspace between the first lens and the second lens be D2, the following conditional expressions are satisfied:

$$1 < F3/F < 4 \quad (1)$$

$$0.1 < D2/F < 2 \quad (2)$$

4. The imaging lens as set forth in claim 3,
   wherein letting a distance from the image side surface of the second lens to the stop be D4, a distance from the stop to the object side surface of the third lens be D5, and refractive indexes relative to a d-line of the fourth lens and the fifth lens be N4, N5, respectively, the following conditional expressions are satisfied:

$$1 < D4/D5 \quad (3)$$

$$0.05 < |N4-N5| < 0.40 \quad (4)$$

5. The imaging lens as set forth in claim 4,
   wherein a linear expansion coefficient of a material for the first lens to the fifth lens is $12 \times 10^{-6}$[1/K] or less.

6. The camera system comprising:
   an imaging lens as set forth in claim 5; and
   a solid state imaging device that converts an optical image picked up by the imaging lens into an electric signal.

7. An imaging lens comprising, in order from an object side:
   a first lens having a negative refractive power with a concave surface directed to an image side thereof;
   a second lens having a positive refractive power with a convex surface directed to an image side thereof and having an absolute value of a radius of curvature on the image side is equal to or smaller than that on an object side thereof;
   stop;
   a third lens which is a planoconvex lens having a plane on an object side thereof or a double-convex lens having on an object side thereof a surface of which an absolute value of a radius of curvature is larger than that on an image side thereof; and
   a compound lens of a fourth lens and a fifth lens, the compound lens having a positive composite power,
   wherein letting a distance from the image side surface of the second lens to the stop be D4, a distance from the stop to the object side surface of the third lens be D5, and refractive indexes relative to a d-line of the fourth lens and the fifth lens be N4, N5, respectively, the following conditional expressions are satisfied:

$$1 < D4/D5 \quad (3)$$

$$0.05 < |N4-N5| < 0.40 \quad (4).$$

8. The imaging lens as set forth in claim 7,
   wherein the second lens is a double-convex lens.

9. The imaging lens as set forth in claim 7,
wherein the fourth lens is a double-convex lens.

10. The imaging lens as set forth in claim 7,
wherein a linear expansion coefficient of a material for the first lens to the fifth lens is $12\times10^{-6}$[1/K] or less.

11. The camera system comprising:
an imaging lens as set forth in claim 7; and
a solid state imaging device that converts an optical image picked up by the imaging lens into an electric signal.

* * * * *